US006426755B1

(12) United States Patent
Deering

(10) Patent No.: US 6,426,755 B1
(45) Date of Patent: Jul. 30, 2002

(54) GRAPHICS SYSTEM USING SAMPLE TAGS FOR BLUR

(75) Inventor: Michael F. Deering, Los Altos, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/571,768

(22) Filed: May 16, 2000

(51) Int. Cl.⁷ .................................................. G09G 5/00
(52) U.S. Cl. .................... 345/581; 345/582; 345/426; 345/611; 345/612; 345/616; 382/264
(58) Field of Search ................................. 345/429, 581, 345/611, 419, 582, 612, 606, 422, 426, 502, 616; 382/173, 264

(56) References Cited

U.S. PATENT DOCUMENTS

| 5,117,289 | A | | 5/1992 | Farley et al. | |
|---|---|---|---|---|---|
| 5,446,834 | A | | 8/1995 | Deering | |
| 5,619,438 | A | | 4/1997 | Farley et al. | |
| 5,638,176 | A | | 6/1997 | Hobbs et al. | |
| 5,793,371 | A | | 8/1998 | Deering | |
| 5,995,111 | A | * | 11/1999 | Morioka et al. | ............. 345/429 |
| 6,185,328 | B1 | * | 2/2001 | Shiau | .......................... 382/173 |

FOREIGN PATENT DOCUMENTS

| EP | 0 313 101 | 4/1989 |
|---|---|---|
| EP | 0 463 700 | 1/1992 |
| GB | 2 278 524 | 11/1994 |
| WO | 91/14995 | 10/1991 |

OTHER PUBLICATIONS

Patent Abstracts of Japan, Publication No. 08063608, published Mar. 8, 1996.
Bjernfalk, "The Memory System Makes the Difference," Feb. 1999, Evans & Sutherland Computer Company, pp. 1–11.
Bjernfalk, "Introducing REALimage™ 4000 and the HYPERpixel™ Architecture," Aug. 1999, Evans & Sutherland Computer Company, pp. 1–9.
Slater et al., "Simulating Peripheral Vision in Immersive Virtual Environments," Computers & Graphics, vol. 17, No. 6, Nov. 1993, pp. 643–653.
Foley et al., Computer Graphics, Principles and Practice, Second Edition in C, ©1996, 1990 by Addison–Wesley Publishing Co., pp. 620, 643–645, 788–791.
De Valois et al., Spatial Vision, ©1990 by Oxford University Press, pp. 38–60.
Glassner, Principles of Digital Image Synthesis, vol. One, ©1995 by Morgan Kaufman Publishers, pp. 243–244, 359–365.
Upstill, The RenderMan™ Companion, A Programmer's Guide to Realistic Computer Graphics, ©1990 by Pixar, pp. 137–146, 171–178, 193–237, 273–285, 287–309.

* cited by examiner

Primary Examiner—Mark Zimmerman
Assistant Examiner—Kimbinh T. Nguyen
(74) Attorney, Agent, or Firm—Conley, Rose & Tayon PC

(57) ABSTRACT

A graphics system and method for performing blur effects, including motion blur and depth of field effects, are disclosed. In one embodiment the system comprises a graphics processor, a sample buffer, and a sample-to-pixel calculation unit. The graphics processor is configured to receive a set of three-dimensional (3D) graphics data and render a plurality of samples based on the set of 3D graphics data. The processor is also configured to generate sample tags for the samples, wherein the sample tags are indicative of whether or not the samples are to be blurred. The super-sampled sample buffer is coupled to receive and store the samples from the graphics processor. The sample-to-pixel calculation unit is coupled to receive and filter the samples from the super-sampled sample buffer to generate output pixels, which in turn are displayable to form an image on a display device. The sample-to-pixel calculation units are configured to select the filter attributes used to filter the samples into output pixels based on the sample tags.

49 Claims, 29 Drawing Sheets

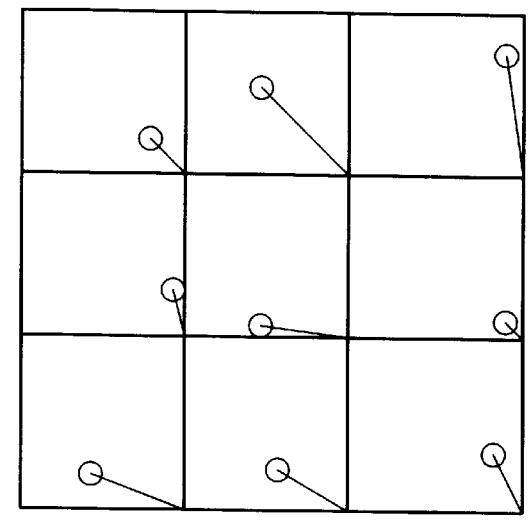
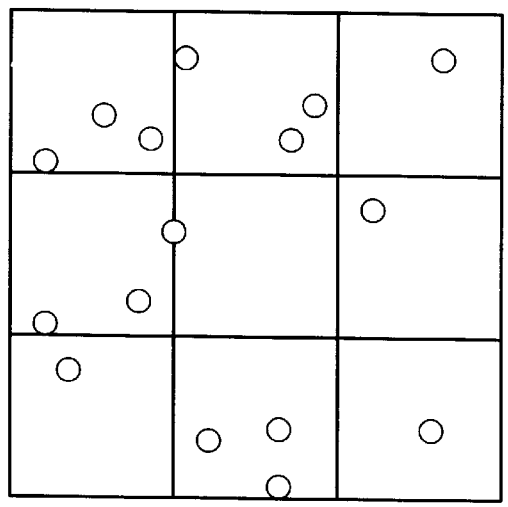
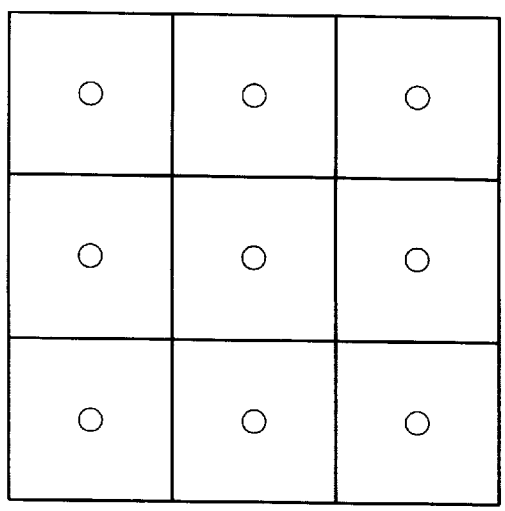
FIG. 14

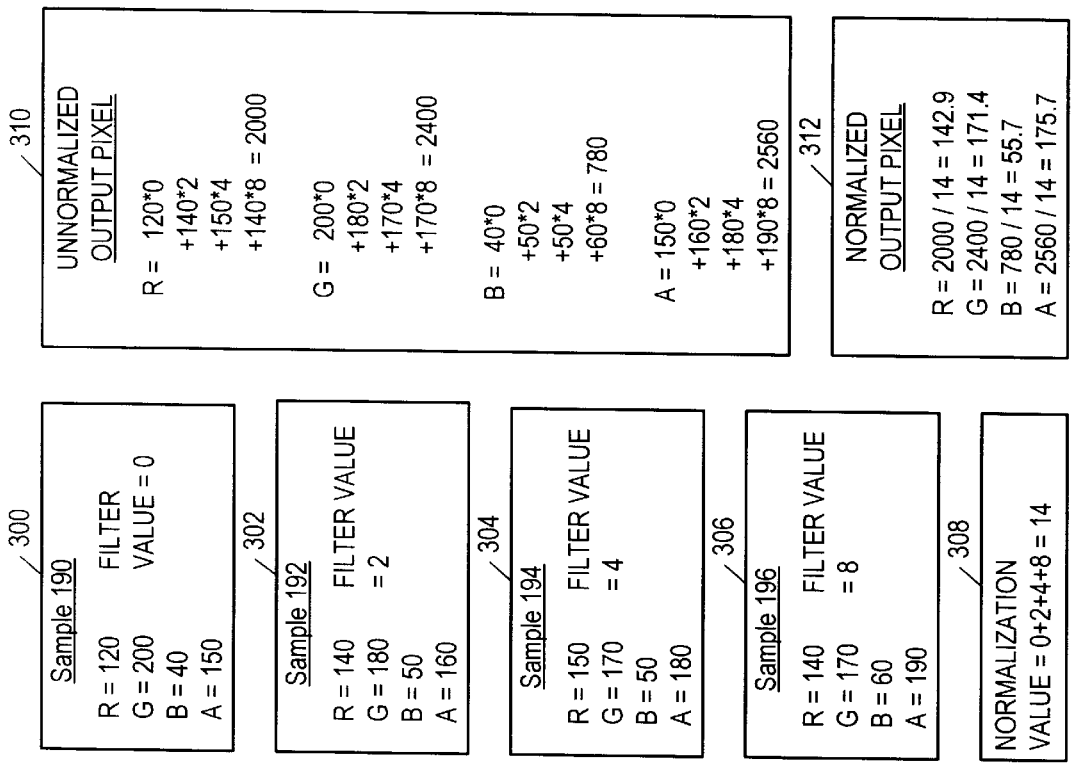
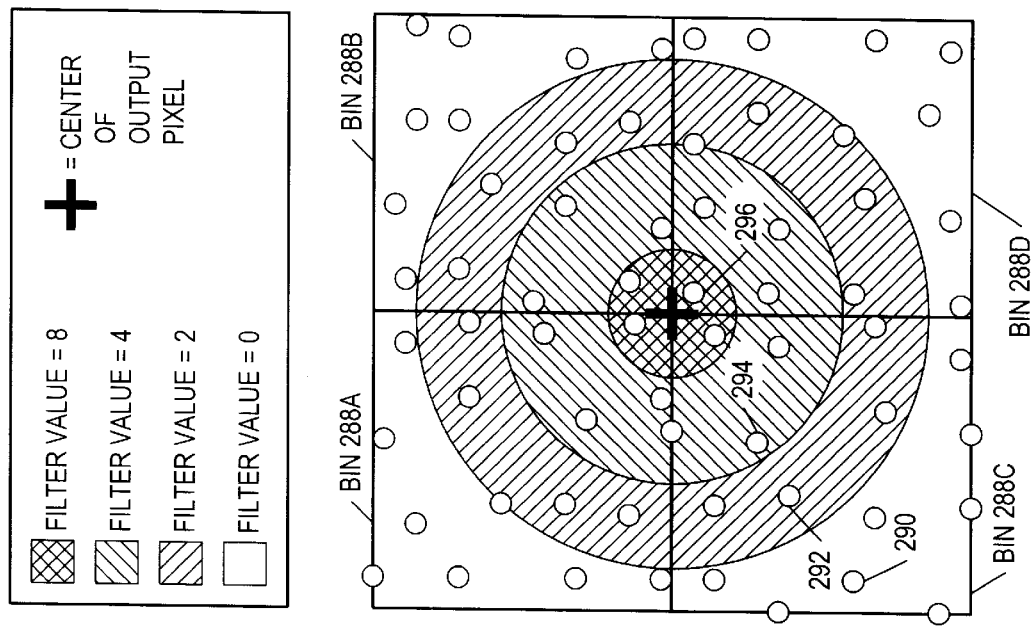
FIG. 22

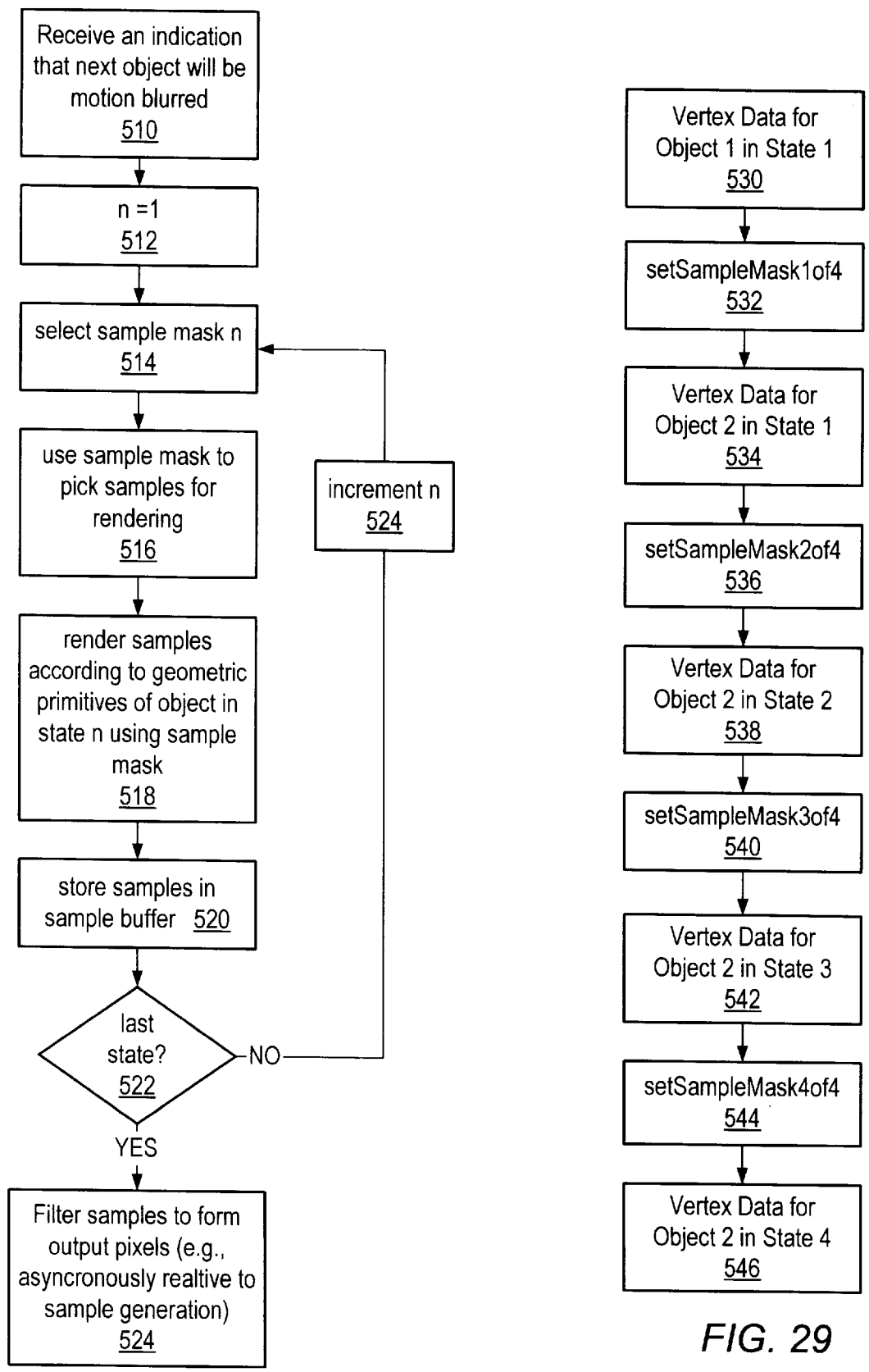

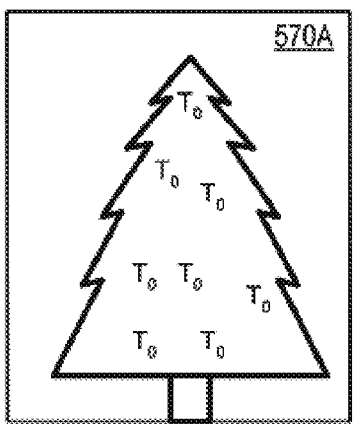
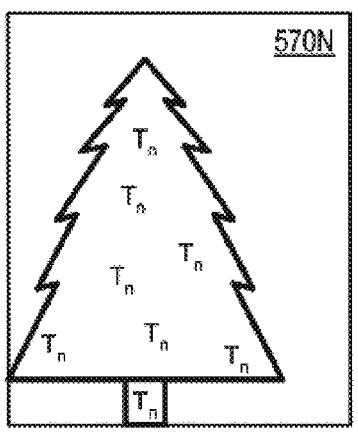
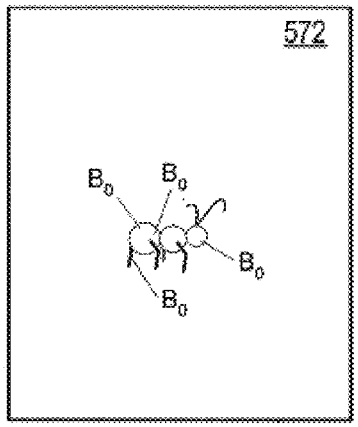
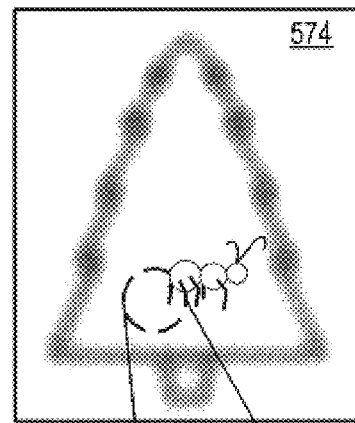
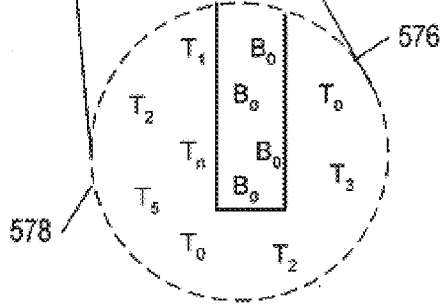
FIG. 31

GRAPHICS SYSTEM USING SAMPLE TAGS FOR BLUR

BACKGROUND OF THE INVENTION

1. Field of the Invention

This invention relates generally to the field of computer graphics and, more particularly, to graphics systems that render realistic images based on three-dimensional graphics data.

2. Description of the Related Art

A computer system typically relies upon its graphics system for producing visual output on a computer screen or display device. Early graphics systems were only responsible for taking what the processor produced as output and displaying it on the screen. In essence, they acted as simple translators or interfaces. Modern graphics systems, however, incorporate graphics processors with a great deal of processing power. The graphics systems now act more like coprocessors rather than simple translators. This change is due to the recent increase in both the complexity and amount of data being sent to the display device. For example, modern computer displays have many more pixels, greater color depth, and are able to display images with higher refresh rates than earlier models. Similarly, the images displayed are now more complex and may involve advanced rendering and visual techniques such as anti-aliasing and texture mapping.

As a result, without considerable processing power in the graphics system, the computer system's CPU would spend a great deal of time performing graphics calculations. This could rob the computer system of the processing power needed for performing other tasks associated with program execution, and thereby dramatically reduce overall system performance. With a powerful graphics system, however, when the CPU is instructed to draw a box on the screen, the CPU is freed from having to compute the position and color of each pixel. Instead, the CPU may send a request to the video card stating "draw a box at these coordinates." The graphics system then draws the box, freeing the CPU to perform other tasks.

Since graphics systems typically perform only a limited set of functions, they may be customized and therefore far more efficient at graphics operations than the computer's general-purpose microprocessor. While early graphics systems were limited to performing two-dimensional (2D) graphics, their functionality has increased to support three-dimensional (3D) wire-frame graphics, 3D solids, and now includes support for textures and special effects such as advanced shading, fogging, alpha-blending, and specular highlighting.

The rendering ability of 3D graphics systems has been improving at a breakneck pace. A few years ago, shaded images of simple objects could only be rendered at a few frames per second, but today's systems support the rendering of complex objects at 60 Hz or higher. At this rate of increase, in the not too distant future graphics systems will literally be able to render more pixels in realtime than a single human's visual system can perceive. While this extra performance may be useable in multiple-viewer environments, it may be wasted in the more common single-viewer environments. Thus, a graphics system is desired which is capable of utilizing the increased graphics processing power to generate more realistic images.

While the number of pixels and frame rate is important in determining graphics system performance, another factor of equal or greater importance is the visual quality of the image generated. For example, an image with a high pixel density may still appear unrealistic if edges within the image are too sharp or jagged (also referred to as "aliased"). One well-known technique to overcome these problems is anti-aliasing. Anti-aliasing involves smoothing the edges of objects by shading pixels along the borders of graphical elements. More specifically, anti-aliasing entails removing higher frequency components from an image before they cause disturbing visual artifacts. For example, anti-aliasing may soften or smooth high contrast edges in an image by forcing certain pixels to intermediate values (e.g., around the silhouette of a bright object superimposed against a dark background).

Another visual effect that adds realism and improves the quality of the image is called "motion blur". Motion blur is the ability to selectively blur objects that are in motion. For example, if a car is moving quickly across the screen, the scene will tend to appear more realistic if the car is blurred relative to the background.

Turning now to FIGS. 1A–C, an example sequence of frames is shown. Each frame represents the scene rendered at a particular point in time. Unfortunately, when these frames are displayed in rapid succession, the resulting image of the car moving across the scene appears unrealistic to most viewers because the car appears "too sharp" or too "in focus".

Turning now to FIGS. 2A–B, a slightly more realistic set of frames is shown. In these frames, the background (i.e., the traffic light) is stationary while car is rendered across a range of different positions in each frame. When displayed in rapid succession, a series of frames such as those in FIGS. 2A–B will appear more realistic than the series of frames in FIGS. 1A–C.

Turning now to FIG. 3, an image with even more realistic motion blur is shown as the figure illustrates. The motion of the car is conveyed in a more convincing manner with motion blur applied. The motion of the car is particularly apparent when compared with the sharp or in-focus nature of the traffic light.

Turning now to FIG. 4, another example image illustrating motion blur is shown. In this image, however, the viewpoint (i.e., also called the camera location) is panned to match the movement of the car. As a result, the stationary traffic light appears to be blurred while the rapidly moving car appears to be sharp and in-focus.

As these example images illustrate, a graphics system configured to generate images with motion blur would be particularly desirable. Furthermore, a system and method for rendering realistic images with ability to selectively "turn on" motion blur for specific objects in a scene (e.g., the traffic light or the car) is desired.

Another desirable visual effect for graphics systems is a depth of field effect. Depending upon the implementation, depth of field effect attempts to blur objects or areas of an image or scene that are either too close or too far away from a particular focal point. In many cases, the focal point and amount of blur is a function of camera or viewpoint parameters determined by the graphic artist creating the scene. For example, an artist may create a scene in which a bird is perched on the branch of a tree. The leaves in front of the bird, the leaves behind the bird, and the mountains in the background may all be blurred, while the bird may be in sharp focus. This effect may mimic the image seen through the lens of a camera that is focused on a particular object in the distance.

Yet another visual effect for graphics systems is a type of transparency effect referred to as a "screen door" effect. This effect attempts to mimic the image that results from viewing a scene from a distance through certain semi-opaque objects, for example a window screen or chain link fence.

Advantageously, these effects allow artists and graphics programmers to improve the realism of images rendered on computer graphics systems. Most graphics systems, however, do not have hardware capable of implementing these effects in real time. As a result, these effects are typically only applied offline on a frame-by-frame basis using software applications (e.g., using Pixar's Renderman™ application). Since these effects tend to be highly dependent upon viewpoint location, the lack of hardware capable of performing these effects in real time prevents applications such as 3D games and simulators from taking full advantage of these effects. Thus a graphics system capable of performing motion blur, depth of field, and/or transparency effects in real time is needed.

SUMMARY OF THE INVENTION

The present invention contemplates the use of a "super-sampled" graphics system that selectively renders samples into a sample buffer, and then filters the samples in realtime to form output pixels. Advantageously, this configuration allows the graphics system to generate high quality images and to selectively apply one or more of the effects described above (e.g., motion blur, depth of field, and screen door-type transparency) in real time.

In one embodiment, the graphics system may comprise a graphics processor, a sample buffer, and a sample-to-pixel calculation unit. The graphics processor is configured to receive a set of three-dimensional (3D) graphics data and render a plurality of samples based on the set of 3D graphics data. The processor is also configured to generate sample tags for the samples, wherein the sample tags are indicative of whether or not the samples are to be blurred. The super-sampled sample buffer is coupled to receive and store the samples from the graphics processor. The sample-to-pixel calculation unit is coupled to receive and filter the samples from the super-sampled sample buffer to generate output pixels, which in turn are displayable to form an image on a display device. The sample-to-pixel calculation units are configured to select the filter attributes used to filter the samples into output pixels based on the sample tags. The graphics processor may effective calculate how blurry a particular sample is, and then store a tag that indicates the level of blur with the sample in the sample buffer. Advantageously, this may in some embodiments be configured to filter the samples into blurred output pixels in real-time and without storing the samples in an intervening frame buffer.

Depending upon the exact implementation, the attributes encoded in the sample tag may include one or more of the following: the filter's extent or boundary (e.g., a radius for a circular filter), the filter shape (e.g., circular, box, ellipsoidal, spherical, etc.), the filter type (sinc, tent, band pass, etc.), the directional orientation of the filter (not applicable in all cases), and the maximum or minimum number of samples to be filtered. The sample-to-pixel calculation units may be configured to select different filters and/or filter attributes on a pixel-by-pixel basis for each particular output pixel based on the tags associated with the samples being filtered.

In the event that the samples being filtered have different tags, a number of different "tie-breakers" may be used to select which filter should be used. In one embodiment, the sample-to-pixel calculation units may be configured to select the filter attributes based on the sample tag that corresponds to the sample that is the closest to the center of the filter. In another embodiment, the sample-to-pixel calculation units may be configured to select the filter attributes used based on the most prevalent sample tag for each set of samples being filtered to form each particular output pixel.

In some embodiments, the samples may be stored in the sample buffer according to bins. The sample-to-pixel calculation units may then be configured to select a small filter radius when no samples with blur tags are within any of the bins that contain potential samples for a particular output pixel. If, however, there are samples with tags that indicate blur within one or more of the bins, then the sample-to-pixel calculation units may be configured to select a larger filter radius. The sample tags may be stored in a separate memory (still considered part of the "sample buffer" for purposes of this application), or in a part of the sample buffer proper (e.g., in the portion of the sample buffer designated for alpha or transparency information). The graphics processor may be configured to determine the appropriate tag for each sample based on a number of different criteria, such as the desired final image attributes, blur data embedded within the 3D geometry data, and the viewer's viewpoint/point of focus/point of foveation (defined below).

A method for rendering a set of 3D graphics data is also contemplated. In one embodiment the method comprises rendering a plurality of samples based on the 3D graphics data. Tags are generated for the samples, wherein the tags are indicative of the samples' blurriness. The rendered samples and tags are stored in a sample. One or more sets of stored samples are selected to be filtered into output pixels, and the filter to be used is selected based on the selected samples' tags. Finally, the selected samples are filtered to form output pixels using the selected filter. As noted above, the samples may be filtered into output pixels in real-time and may be provided to a display device without being stored in an intervening frame buffer. Advantageously, depending upon the exact implementation, the tags may encode filter attribute information to implement one or more different blur-type effects, e.g., motion blur, depth of field effects, and ripple effects.

BRIEF DESCRIPTION OF THE DRAWINGS

The foregoing, as well as other objects, features, and advantages of this invention may be more completely understood by reference to the following detailed description when read together with the accompanying drawings in which:

FIG. 14 is a diagram illustrating details of three different embodiments of sample positioning schemes;

FIG. 22 is a diagram illustrating details of one embodiment of a pixel convolution for an example set of samples;

FIG. 28 is another flowchart illustrating one embodiment of a method for performing motion blur;

FIG. 29 is a data flow diagram illustrating one possible method for encoding three-dimensional geometry data to support motion blur.

FIG. 31 is a diagram illustrating one method for performing depth of field effects.

Figure 1A:
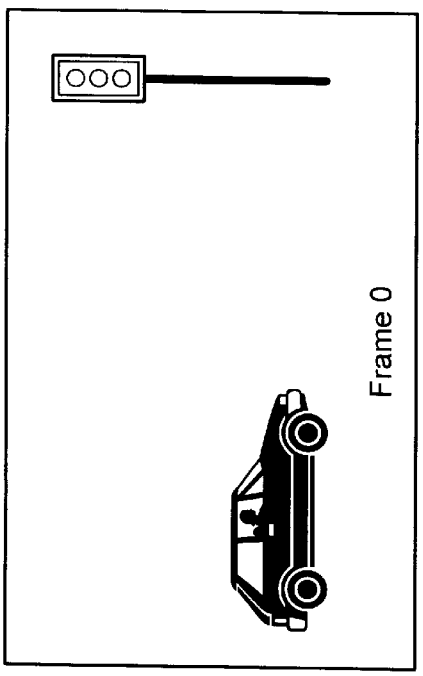
FIGS. 1A–C show an example sequence of frames showing a moving car.
Figure 1B:
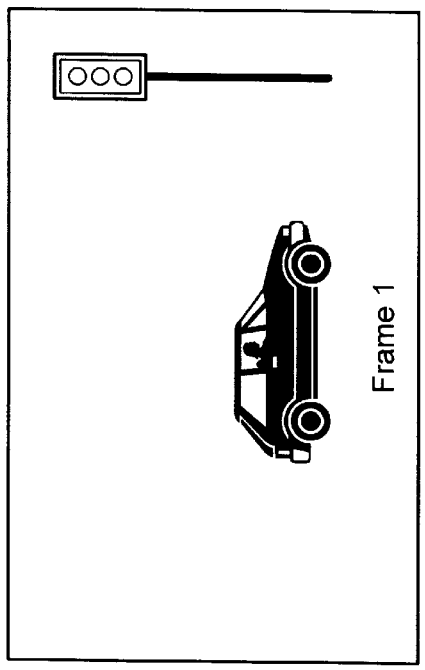
Figure 1C:
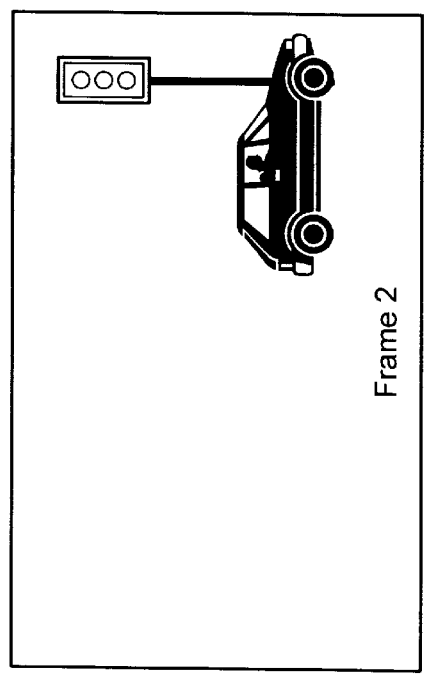
Figure 2A:
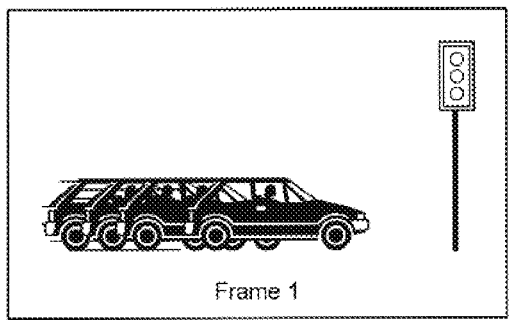
FIGS. 2A–B show a slightly more realistic set of frames showing a moving car.
Figure 2B:
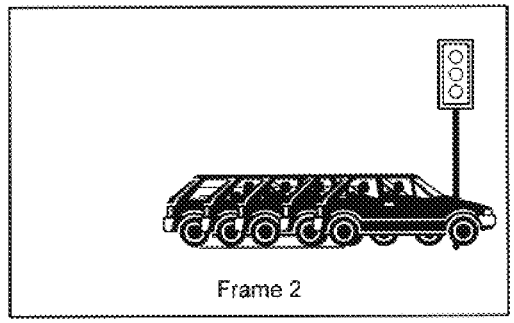
Figure 3:
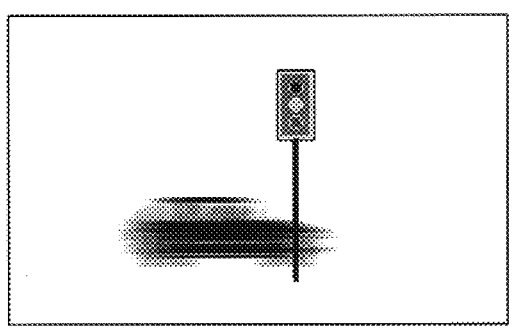
FIG. 3 shows an image of a moving car with one embodiment of motion blur.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

Figure 5:
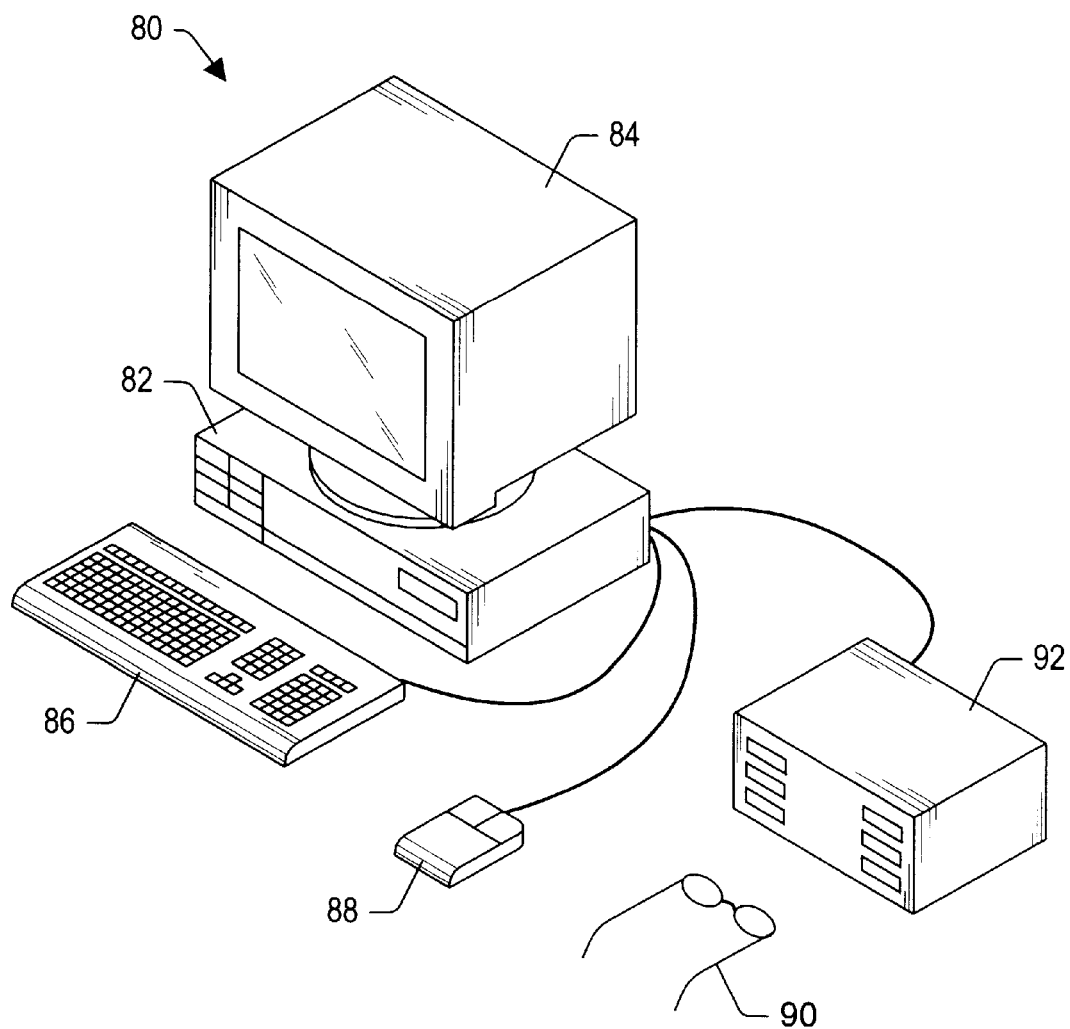
FIG. 5 illustrates one embodiment of a computer system.

Computer System—FIG. 5

Referring now to FIG. 5, one embodiment of a computer system 80 that includes a three-dimensional (3-D) graphics system is shown. The 3-D graphics system may be comprised in any of various systems, including a computer system, network PC, Internet appliance, a television, including HDTV systems and interactive television systems, personal digital assistants (PDAs), wearable computers, and other devices which display 2D and or 3D graphics, among others.

As shown, the computer system 80 comprises a system unit 82 and a video monitor or display device 84 coupled to the system unit 82. The display device 84 may be any of various types of display monitors or devices (e.g., a CRT, LCD, reflective liquid-crystal-on-silicon (LCOS), or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, body sensors, etc.). Application software may be executed by the computer system 80 to display 3-D graphical objects on display device 84. As described further below, the 3-D graphics system in computer system 80 includes a super-sampled sample buffer with a programmable real-time sample-to-pixel calculation unit to improve the quality and realism of images displayed on display device 84.

Figure 6:
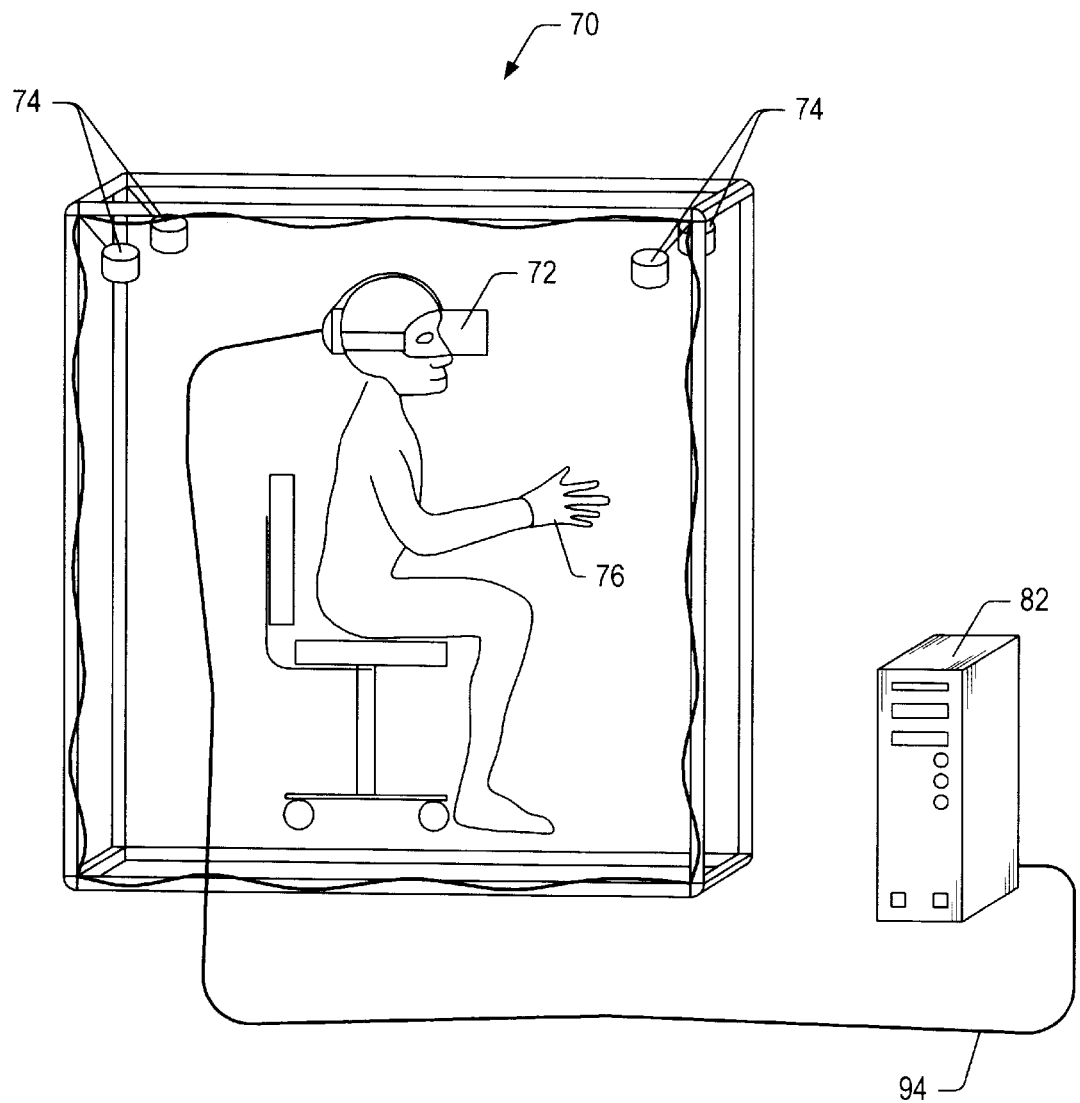
FIG. 6 illustrates another embodiment of a computer system that is part of virtual reality workstation.

FIG. 6 illustrates another embodiment of a computer system 70 that serves as a virtual reality workstation. In this embodiment, the system comprises a head-mounted display device 72, head-tracking sensors 74, and a data glove 76. Head mounted display 72 may be coupled to system unit 82 via a fiber optic link 94, or one or more of the following: an electrically-conductive link, an infra-red link, or a wireless (e.g., RF) link. In this embodiment, system unit 82 does not utilize a storage array. Instead, system unit 82 receives compressed 3D movies via broadcast, internet link, or satellite link (e.g., at a rate of 42 megabytes per second). Other embodiments are possible and contemplated.

Figure 7:
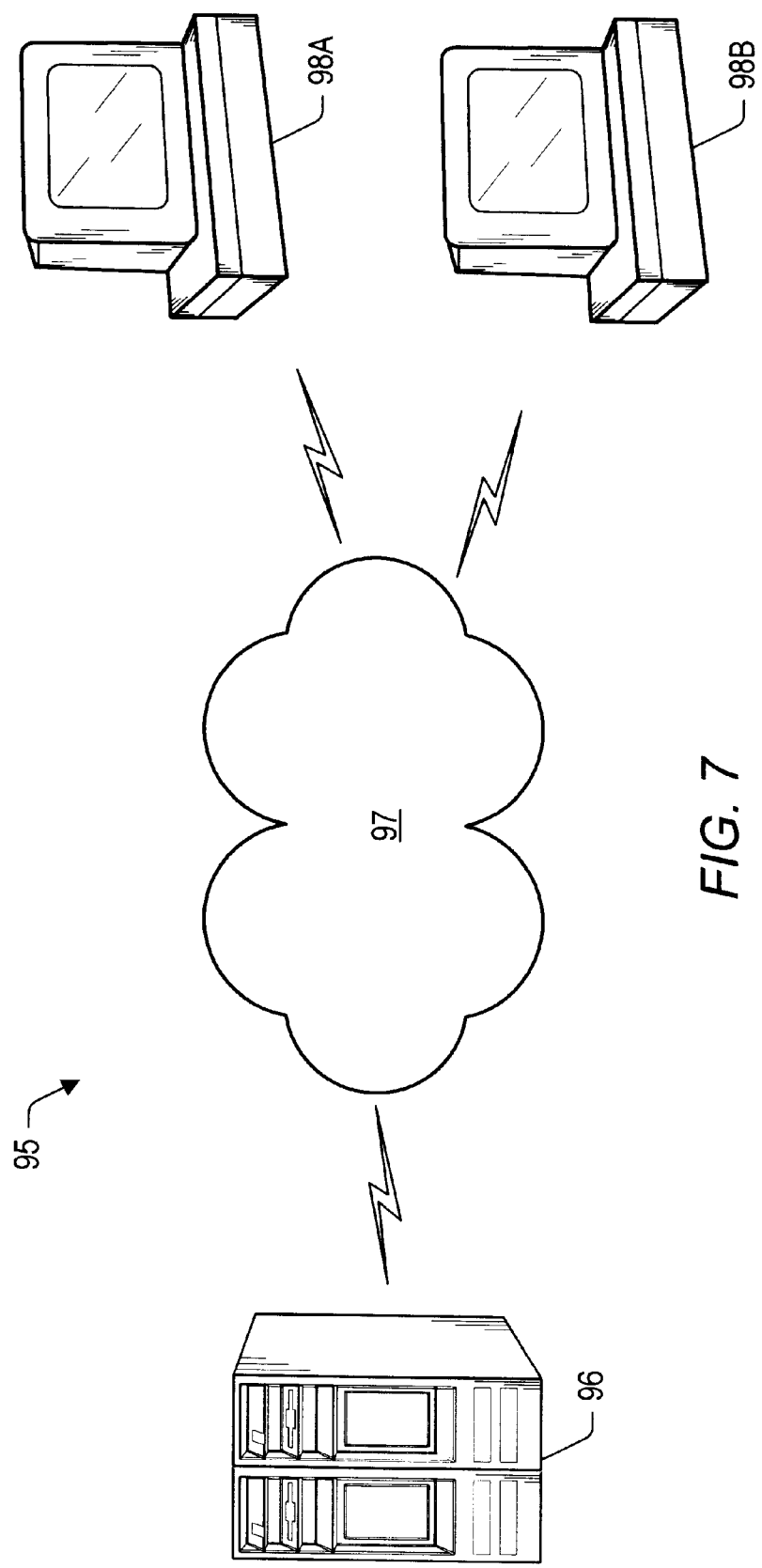
FIG. 7 illustrates one embodiment of a computer network.

Computer Network—FIG. 7

Figure 4:
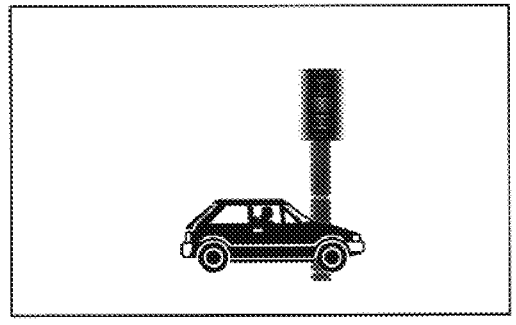
FIG. 4 shows an image illustrating one embodiment of motion blur with a moving viewpoint.

Referring now to FIG. 7, a computer network 95 is shown comprising at least one server computer 96 and one or more client computers 98A–N. (In the embodiment shown in FIG. 4, client computers 98A–B are depicted). One or more of the client systems may be configured similarly to computer system 80, with each having one or more graphics systems 112 as described above. Server 96 and client(s) 98 may be joined through a variety of connections 97, such as a local-area network (LAN), a wide-area network (WAN), or an Internet connection. In one embodiment, server 96 may store and transmit 3-D geometry data (which may be compressed) to one or more of clients 98. The clients 98 receive the compressed 3-D geometry data, decompress it (if necessary) and then render the geometry data. The rendered image is then displayed on the client's display device. The clients render the geometry data and display the image using super-sampled sample buffer and real-time filter techniques described above. In another embodiment, the compressed 3-D geometry data may be transferred between client computers 98.

Figure 8:
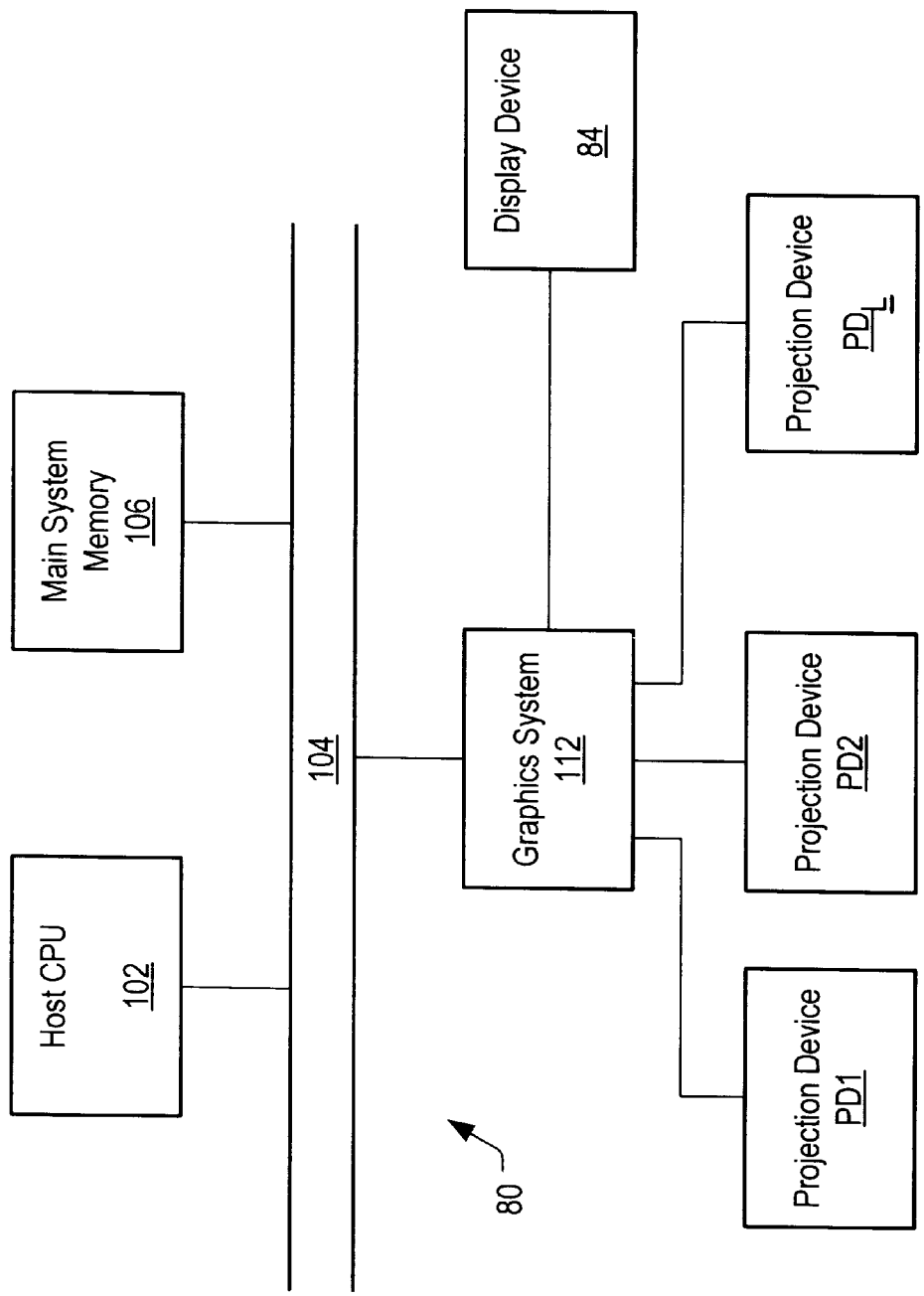
FIG. 8 is a simplified block diagram of the computer system of FIG. 5.

Computer System Block Diagram—FIG. 8

Referring now to FIG. 8, a simplified block diagram illustrating the computer system of FIG. 8 is shown. Elements of the computer system that are not necessary for an understanding of the present invention are not shown for convenience. As shown, the computer system 80 includes a central processing unit (CPU) 102 coupled to a high-speed memory bus or system bus 104 also referred to as the host bus 104. A system memory 106 may also be coupled to high-speed bus 104.

Host processor 102 may comprise one or more processors of varying types, e.g., microprocessors, multi-processors and CPUs. The system memory 106 may comprise any combination of different types of memory subsystems, including random access memories, (e.g., static random access memories or "SRAMs", synchronous dynamic random access memories or "SDRAMs", and Rambus dynamic access memories or "RDRAM", among others) and mass storage devices. The system bus or host bus 104 may comprise one or more communication or host computer buses (for communication between host processors, CPUs, and memory subsystems) as well as specialized subsystem buses.

A 3-D graphics system or graphics system 112 according to the present invention is coupled to the high-speed memory bus 104. The 3-D graphics system 112 may be coupled to the bus 104 by, for example, a crossbar switch or other bus connectivity logic. It is assumed that various other peripheral devices, or other buses, may be connected to the high-speed memory bus 104. It is noted that the 3-D graphics system may be coupled to one or more of the buses in computer system 80 and/or may be coupled to various types of buses. In addition, the 3D graphics system may be coupled to a communication port and thereby directly receive graphics data from an external source, e.g., the Internet or a network. As shown in the figure, display device 84 is connected to the 3-D graphics system 112 comprised in the computer system 80.

Host CPU 102 may transfer information to and from the graphics system 112 according to a programmed input/output (I/O) protocol over host bus 104. Alternately, graphics system 112 may access the memory subsystem 106 according to a direct memory access (DMA) protocol or through intelligent bus mastering.

A graphics application program conforming to an application programming interface (API) such as OpenGL or Java 3D may execute on host CPU 102 and generate commands and data that define a geometric primitive (graphics data) such as a polygon for output on display device 84. As defined by the particular graphics interface used, these primitives may have separate color properties for the front and back surfaces. Host processor 102 may transfer these graphics data to memory subsystem 106. Thereafter, the host processor 102 may operate to transfer the graphics data to the graphics system 112 over the host bus 104. In another embodiment, the graphics system 112 may read in geometry data arrays over the host bus 104 using DMA access cycles.

In yet another embodiment, the graphics system 112 may be coupled to the system memory 106 through a direct port, such as the Advanced Graphics Port (AGP) promulgated by Intel Corporation.

The graphics system may receive graphics data from any of various sources, including the host CPU 102 and/or the system memory 106, other memory, or from an external source such as a network, e.g., the Internet, or from a broadcast medium, e.g., television, or from other sources.

As will be described below, graphics system 112 may be configured to allow more efficient microcode control, which results in increased performance for handling of incoming color values corresponding to the polygons generated by host processor 102. Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module.

Figure 9:
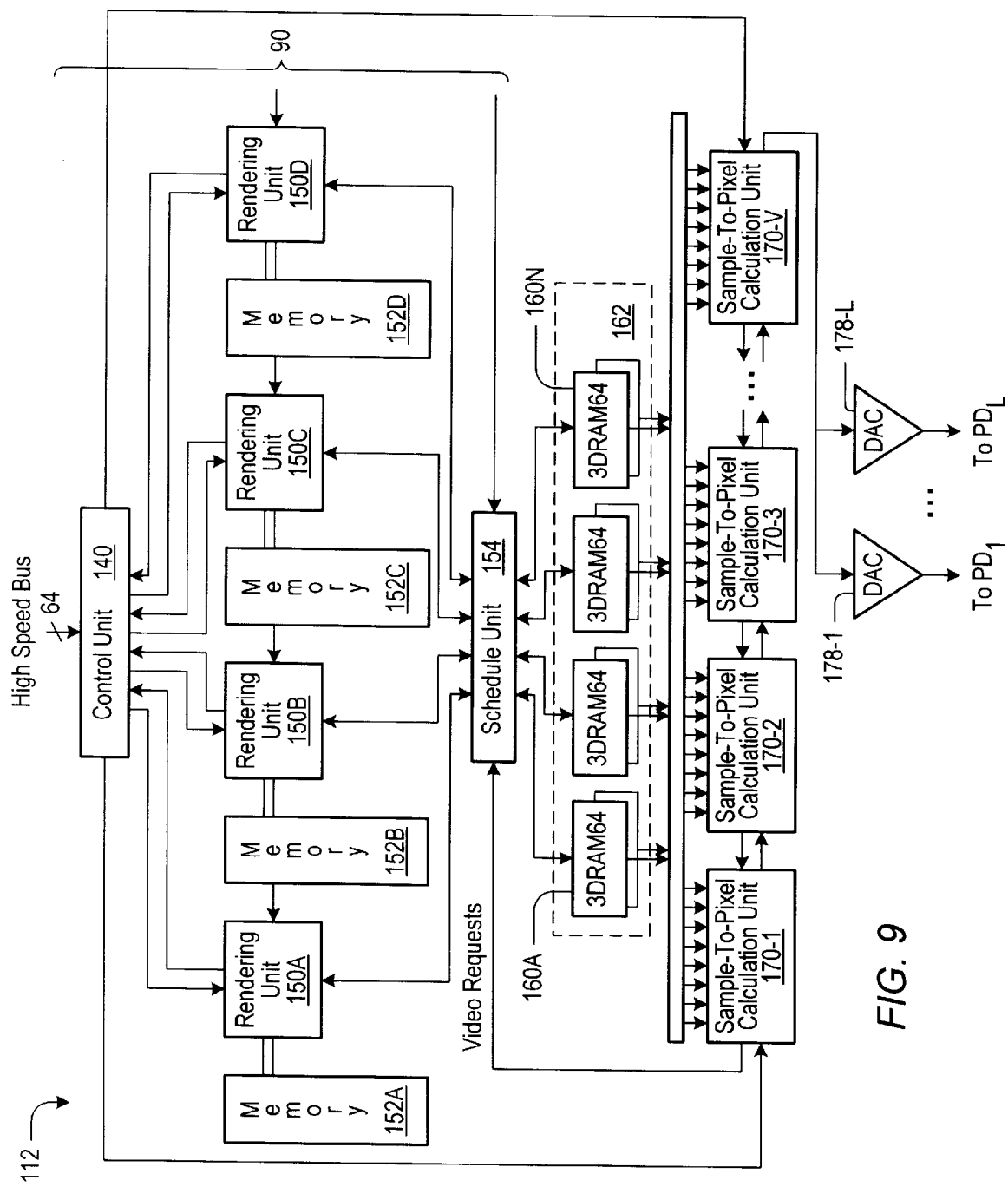
FIG. 9 is a block diagram illustrating more details of one embodiment of the graphics system of FIG. 5.

Graphics System—FIG. 9

Referring now to FIG. 9, a block diagram illustrating details of one embodiment of graphics system 112 is shown. As shown in the figure, graphics system 112 may comprise one or more graphics processors 90, one or more super-sampled sample buffers 162, and one or more sample-to-pixel calculation units 170A–D. Graphics system 112 may also comprise one or more digital-to-analog converters (DACs) 178A–B. Graphics processor 90 may be any suitable type of high performance processor (e.g., specialized graphics processors or calculation units, multimedia processors, DSPs, or general purpose processors). In one embodiment, graphics processor 90 may comprise one or more rendering units 150A–D. In the embodiment shown, however, graphics processor 90 also comprises one or more control units 140, one or more data memories 152A–D, and one or more schedule units 154. Sample buffer 162 may comprises one or more sample memories 160A–160N as shown in the figure.

A. Control Unit

Control unit 140 operates as the interface between graphics system 112 and computer system 80 by controlling the transfer of data between graphics system 112 and computer system 80. In embodiments of graphics system 112 that comprise two or more rendering units 150A–D, control unit 140 may also divide the stream of data received from computer system 80 into a corresponding number of parallel streams that are routed to the individual rendering units 150A–D. The graphics data may be received from computer system 80 in a compressed form. This may advantageously reduce the bandwidth requirements between computer system 80 and graphics system 112. In one embodiment, control unit 140 may be configured to split and route the data stream to rendering units 150A–D in compressed form.

The graphics data may comprise one or more graphics primitives. As used herein, the term graphics primitive includes polygons, parametric surfaces, splines, NURBS (non-uniform rational B-splines), sub-divisions surfaces, fractals, volume primitives, and particle systems. These graphics primitives are described in detail in the text book entitled "Computer Graphics: Principles and Practice" by James D. Foley, et al., published by Addison-Wesley Publishing Co., Inc., 1996. Note polygons are referred to throughout this detailed description for simplicity, but the embodiments and examples described may also be used with graphics data comprising other types of graphics primitives.

B. Rendering Units

Rendering units 150A–D (also referred to herein as draw units or graphics processors) are configured to receive graphics instructions and data from control unit 140 and then perform a number of functions, depending upon the exact implementation. For example, rendering units 150A–D may be configured to perform decompression (if the data is compressed), transformation, clipping, lighting, texturing, depth cueing, transparency processing, set-up, and screen space rendering of various graphics primitives occurring within the graphics data. Each of these features is described separately below. Rendering units 150A–D may be implemented with high speed ASICs (Application Specific Integrated Circuits), or with a high-performance DSP (digital signal processing) type core, or other high performance arithmetic processor (e.g., a processor with one or more a hardware multiplier and adder trees).

Depending upon the type of compressed graphics data received, rendering units 150A–D may be configured to perform arithmetic decoding, run-length decoding, Huffman decoding, and dictionary decoding (e.g., LZ77, LZSS, LZ78, and LZW). In another embodiment, rendering units 150A–D may be configured to decode graphics data that has been compressed using geometric compression. Geometric compression of 3D graphics data may achieve significant reductions in data size while retaining most of the image quality. Two methods for compressing and decompressing 3D geometry are described in U.S. Pat. No. 5,793,371, application Ser. No. 08/511,294, (filed on Aug. 4, 1995, entitled "Method And Apparatus For Geometric Compression Of Three-Dimensional Graphics Data," and U.S. patent application Ser. No. 09/095,777, filed on Jun. 11, 1998, entitled "Compression of Three-Dimensional Geometry Data Representing a Regularly Tiled Surface Portion of a Graphical Object,". In embodiments of graphics system 112 that support decompression, the graphics data received by each rendering unit 150 is decompressed into one or more graphics "primitives" which may then be rendered. The term primitive refers to components of objects that define its shape (e.g., points, lines, triangles, polygons in two or three dimensions, polyhedra, or free-form surfaces in three dimensions). Rendering units 150 may be any suitable type of high performance processor (e.g., specialized graphics processors or calculation units, multimedia processors, DSPs, or general purpose processors).

Transformation refers to manipulating an object and includes translating the object (i.e., moving the object to a different location), scaling the object (i.e., stretching or shrinking), and rotating the object (e.g., in three-dimensional space, or "3-space").

Clipping refers to defining the limits of the displayed image (i.e., establishing a clipping region, usually a rectangle) and then not rendering or displaying pixels that fall outside those limits.

Lighting refers to calculating the illumination of the objects within the displayed image to determine what color and or brightness each individual object will have. Depending upon the shading algorithm being used (e.g., constant, Gourand, or Phong), lighting may be evaluated at a number of different locations. For example, if constant shading is used (i.e., each pixel of a polygon has the same lighting), then the lighting need only be calculated once per polygon. If Gourand shading is used, then the lighting is calculated once per vertex. Phong shading calculates the lighting on a per-pixel basis.

Generally, screen-space set-up refers to setting the primitives up for screen-space rasterization (e.g., calculating slopes or coefficients for plane equations and initial pixel positions).

Screen-space rendering refers to the calculations performed to actually calculate the data used to generate each pixel that will be displayed. In prior art systems, each pixel is calculated and then stored in a frame buffer. The contents of the frame buffer are then output to the display device to create the final image. In the embodiment of graphics system 112 shown in the figure, however, rendering units 150A–D calculate "samples" instead of actual pixel data. This allows rendering units 150A–D to "super-sample" or calculate more than one sample per pixel. Super-sampling is described in greater detail below. Note that rendering units 150A–B may comprises a number of smaller functional units, e.g., a separate set-up/decompress unit and a lighting unit.

More details on super-sampling are discussed in the following books: "Principles of Digital Image Synthesis" by Andrew Glassner, 1995, Morgan Kaufman Publishing (Volume 1); and "Renderman Companion:" by Steve Upstill, 1990, Addison Wesley Publishing.

C. Data Memories

Each rendering unit 150A–D may be coupled to an instruction and data memory 152A–D. In one embodiment, each data memory 152A–D may be configured to store both data and instructions for rendering units 150A–D. While implementations may vary, in one embodiment each data memory 152A–D may comprise two 8 MByte SDRAMs providing a total of 16 MBytes of storage for each rendering unit 150A–D. In another embodiment, RDRAMs (Rambus DRAMs) may be used to support the decompression and set-up operations of each rendering unit, while SDRAMs may be used to support the draw functions of rendering units 150A–D.

D. Schedule Unit

Schedule unit 154 may be coupled between the rendering units 150A–D and the sample memories 160A–N. Schedule unit 154 is configured to sequence the completed samples and store them in sample memories 160A–N. Note in larger configurations, multiple schedule units 154 may be used in parallel. In one embodiment, schedule unit 154 may be implemented as a crossbar switch.

E. Sample Memories

Super-sampled sample buffer 162 comprises sample memories 160A–160N, which are configured to store the plurality of samples generated by the rendering units. As used herein, the term "sample buffer" refers to one or more memories which store samples. As previously noted, one or more samples are filtered to form output pixels (i.e., pixels to be displayed on a display device). The number of samples stored may be greater than, equal to, or less than the total number of pixels output to the display device to refresh a single frame. Each sample may correspond to one or more output pixels. As used herein, a sample "corresponds" to an output pixel when the sample's information contributes to final output value of the pixel. Note, however, that some samples may contribute zero to their corresponding output pixel after filtering takes place.

Stated another way, the sample buffer stores a plurality of samples that have positions that correspond to locations in screen space on the display, i.e., the samples contribute to one or more output pixels on the display. The number of stored samples may be greater than the number of pixel locations, and more than one sample may be combined in the convolution (filtering) process to generate a particular output pixel displayed on the display device. Any given sample may contribute to one or more output pixels.

Sample memories 160A–160N may comprise any of a number of different types of memories (e.g., SDRAMs, SRAMs, RDRAMs, 3DRAMs, or next-generation 3DRAMs) in varying sizes. In one embodiment, each schedule unit 154 is coupled to four banks of sample memories, wherein each bank comprises four 3DRAM-64 memories. Together, the 3DRAM-64 memories may form a 116-bit deep super-sampled sample buffer that stores multiple samples per pixel. For example, in one embodiment, each sample memory 160A–160N may store up to sixteen samples per pixel. 3DRAM-64 memories are specialized memories configured to support full internal double buffering with single buffered Z in one chip. The double buffered portion comprises two RGBX buffers, wherein X is a fourth channel that can be used to store other information (e.g., alpha). 3DRAM-64 memories also have a lookup table that takes in window ID information and controls an internal 2-1 or 3-1 multiplexer that selects which buffer's contents will be output. 3DRAM-64 memories are next-generation 3DRAM memories that may soon be available from Mitsubishi Electric Corporation's Semiconductor Group. In one embodiment, four chips used in combination are sufficient to create a double-buffered 1280×1024 super-sampled sample buffer. Since the memories are internally double-buffered, the input pins for each of the two frame buffers in the double-buffered system are time multiplexed (using multiplexers within the memories). The output pins may similarly be time multiplexed. This allows reduced pin count while still providing the benefits of double buffering. 3DRAM-64 memories further reduce pin count by not having z output pins. Since z comparison and memory buffer selection is dealt with internally, this may simplify sample buffer 162 (e.g., using less or no selection logic on the output side). Use of 3DRAM-64 also reduces memory bandwidth since information may be written into the memory without the traditional process of reading data out, performing a z comparison, and then writing data back in. Instead, the data may be simply written into the 3DRAM-64, with the memory performing the steps described above internally.

However, in other embodiments of graphics system 112, other memories (e.g., SDRAMs, SRAMs, RDRAMs, or current generation 3DRAMs) may be used to form sample buffer 162.

Graphics processor 90 may be configured to generate a plurality of sample positions according to a particular sample positioning scheme (e.g., a regular grid, a perturbed regular grid, etc.). Alternatively, the sample positions (or offsets that are added to regular grid positions to form the sample positions) may be read from a sample position memory (e.g., a RAM/ROM table). Upon receiving a polygon that is to be rendered, graphics processor 90 determines which samples fall within the polygon based upon the sample positions. Graphics processor 90 renders the samples that fall within the polygon and stores rendered samples in sample memories 160A–N. Note as used herein the terms render and draw are used interchangeable and refer to calculating color values for samples. Depth values, alpha values, and other per-sample values may also be calculated in the rendering or drawing process.

E. Sample-to-pixel Calculation Units

Sample-to-pixel calculation units 170A–D may be coupled between sample memories 160A–N and DACs 178A–B. Sample-to-pixel calculation units 170A–D are configured to read selected samples from sample memories 160A–N and then perform a convolution (e.g., a filtering and weighting function or a low pass filter) on the samples to generate the output pixel values which are output to DACs 178A–B. The sample-to-pixel calculation units 170A–D may be programmable to allow them to perform different filter functions at different times, depending upon the type of output desired. In one embodiment, the sample-to-pixel calculation units 170A–D may implement a 5×5 super-sample reconstruction band-pass filter to convert the super-sampled sample buffer data (stored in sample memories 160A–N) to single pixel values. In other embodiments, calculation units 170A–D may filter a selected number of samples to calculate an output pixel. The filtered samples may be multiplied by a variable weighting factor that gives a variable weight to samples based on the sample's position relative to the center of the pixel being calculated. Other filtering functions may also be used either alone or in combination, e.g., tent filters, circular filters, elliptical filters, Mitchell-Netravalli filters, band pass filters, sync function filters, etc.

Sample-to-pixel calculation units 170A–D may be implemented with ASICs (Application Specific Integrated Circuits), or with a high-performance DSP (digital signal processing) type core, or other high performance arithmetic processor (e.g., a processor with one or more a hardware multiplier and adder trees). Sample-to-pixel calculation units 170A–D may also be configured with one or more of the following features: color look-up using pseudo color tables, direct color, inverse gamma correction, filtering of samples to pixels, programmable gamma corrections, color space conversion and conversion of pixels to non-linear light space. Other features of sample-to-pixel calculation units 170A–D may include programmable video timing generators, programmable pixel clock synthesizers, and crossbar functions. Once the sample-to-pixel calculation units have manipulated the timing and color of each pixel, the pixels are output to DACs 178A–B.

F. DACs

DACs 178A–B operate as the final output stage of graphics system 112. The DACs 178A–B serve to translate the digital pixel data received from cross units 174A–B into analog video signals that are then sent to the display device. Note in one embodiment DACs 178A–B may be bypassed or omitted completely in order to output digital pixel data in lieu of analog video signals. This may be useful when display device 84 is based on a digital technology (e.g., an LCD-type display or a digital micro-mirror display).

Figure 10:
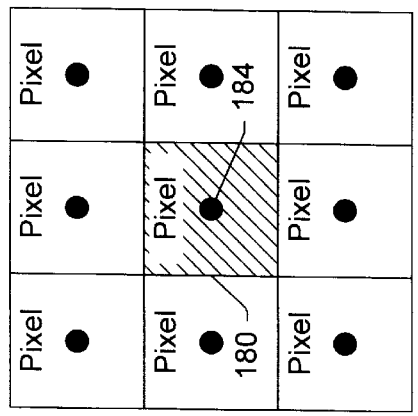
FIG. 10 is diagram illustrating traditional pixel calculation.

Super-Sampling—FIGS. 10–11

Turning now to FIG. 10, an example of traditional, non-super-sampled pixel value calculation is illustrated. Each pixel has exactly one data point calculated for it, and the single data point is located at the center of the pixel. For example, only one data point (i.e., sample 184) contributes to value of pixel 180.

Figure 11B:
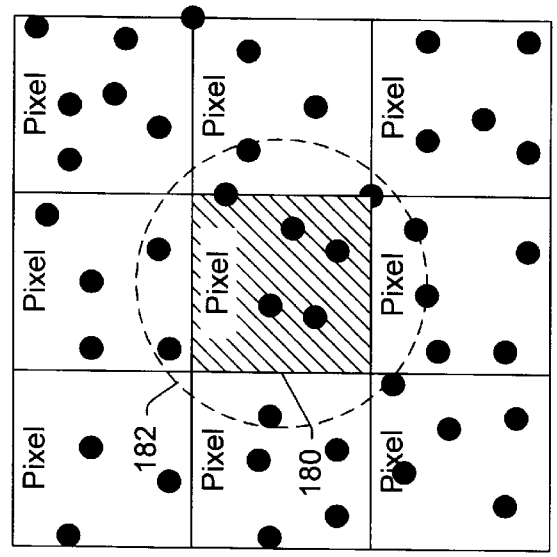
FIG. 11B is diagram illustrating a random distribution of samples.
Figure 11A:
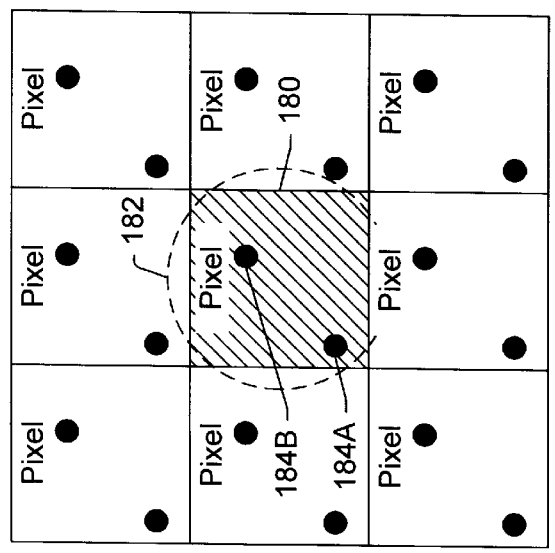
FIG. 11A is diagram illustrating one embodiment of super-sampling.

Turning now to FIG. 11A, an example of one embodiment of super-sampling is illustrated. In this embodiment, a number of samples are calculated. The number of samples may be related to the number of pixels or completely independent of the number of pixels. In this example, there are 18 samples distributed in a regular grid across nine pixels. Even with all the samples present in the figure, a simple one to one correlation could be made (e.g., by throwing out all but the sample nearest to the center of each pixel). However, the more interesting case is performing a filtering function on multiple samples to determine the final pixel values. Also, as noted above, a single sample can be used to generate a plurality of output pixels, i.e., sub-sampling.

A circular filter 182 is illustrated in the figure. In this example, samples 184A–B both contribute to the final value of pixel 180. This filtering process may advantageously improve the realism of the image displayed by smoothing abrupt edges in the displayed image (i.e., performing anti-aliasing). Filter 182 may simply average samples 184A–B to form the final value of output pixel 70, or it may increase the contribution of sample 184B (at the center of pixel 180) and diminish the contribution of sample 184A (i.e., the sample farther away from the center of pixel 180). Circular filter 182 is repositioned for each output pixel being calculated so the center of filter 182 coincides with the center position of the pixel being calculated. Other filters and filter positioning schemes are also possible and contemplated.

Turning now to FIG. 11B, another embodiment of supersampling is illustrated. In this embodiment, however, the samples are positioned randomly. More specifically, different sample positions are selected and provided to graphics processor 90 (and render units 150A–D), which calculate color information to form samples at these different locations. Thus the number of samples falling within filter 182 may vary from pixel to pixel.

Figure 12:
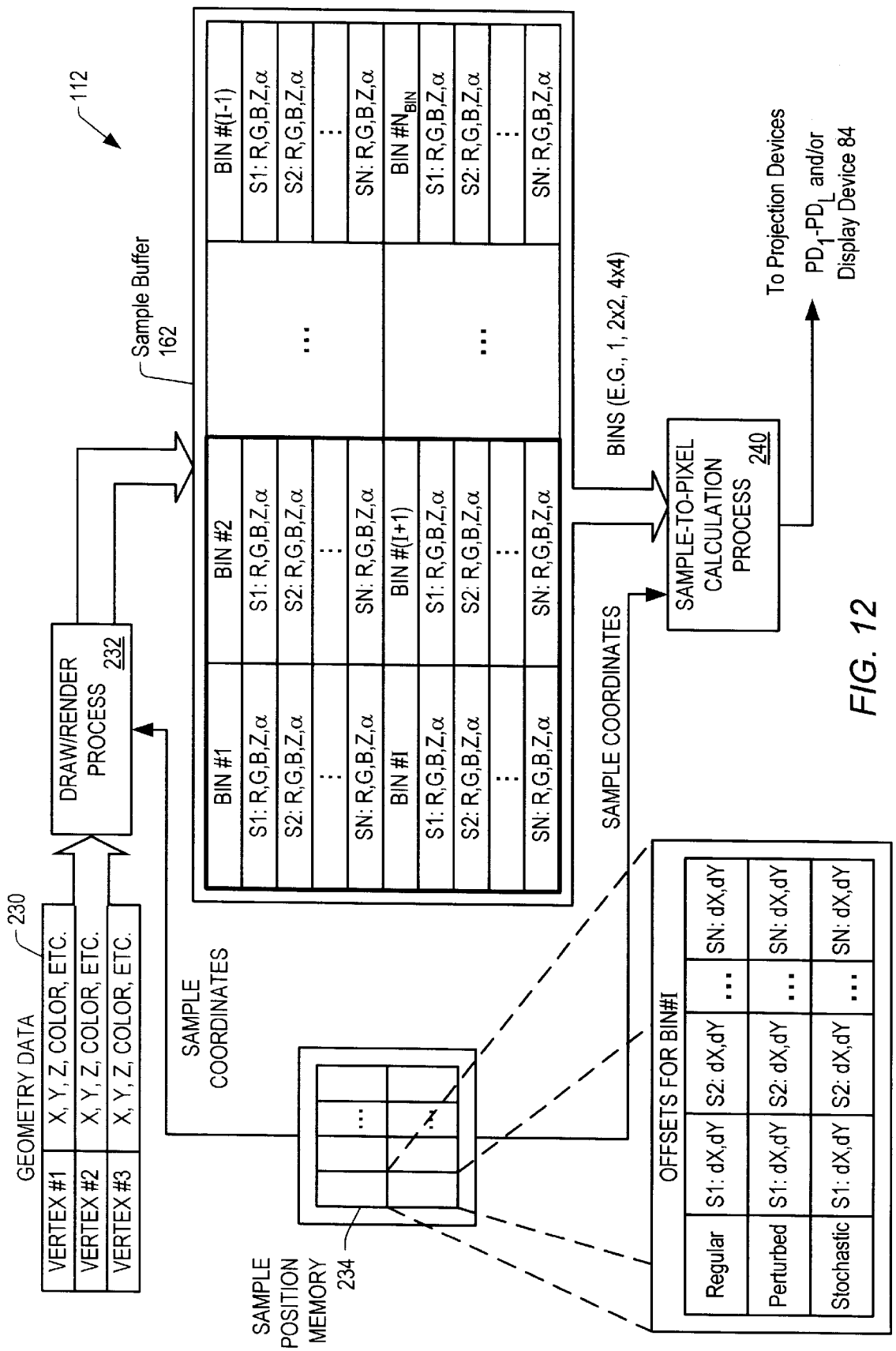
FIG. 12 is a diagram illustrating details of one embodiment of a graphics system having one embodiment of a variable resolution super-sampled sample buffer.
Figure 13:
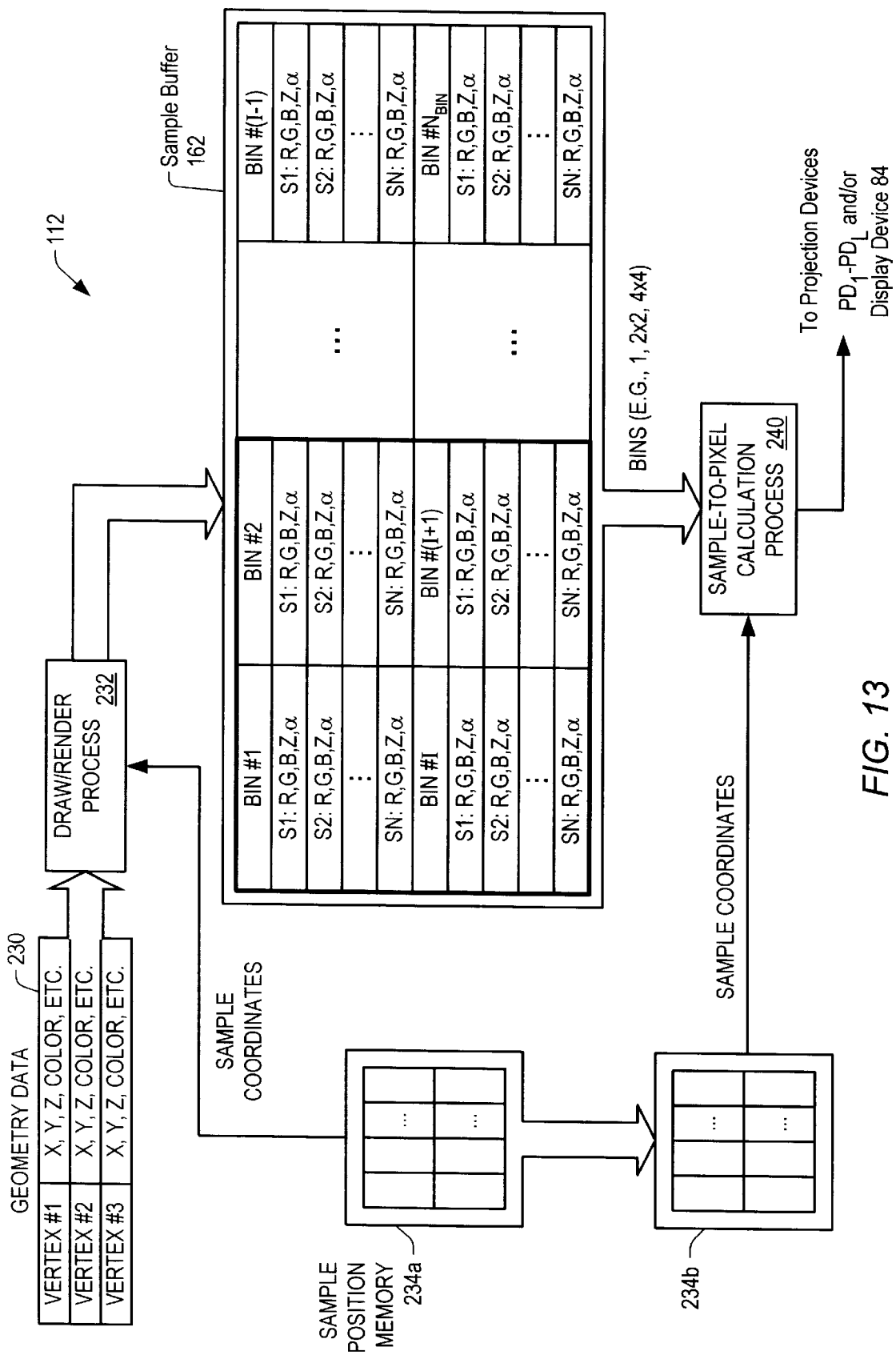
FIG. 13 is a diagram illustrating details of another embodiment of a graphics system having one embodiment of a variable resolution super-sampled sample buffer.

Super-Sampled Sample Buffer with Real-Time Convolution—FIGS. 12–13

Turning now to FIG. 12, a diagram illustrating one possible configuration for the flow of data through one embodiment of graphics system 112 is shown. As the figure shows, geometry data 230 is received by graphics system 112 and used to perform draw process 232. The draw process 232 is implemented by one or more of control unit 140, rendering units 150, memories 152, and schedule unit 154. Geometry data 230 comprises data for one or more polygons. Each polygon comprises a plurality of vertices (e.g., three vertices in the case of a triangle), some of which may be shared. Data such as x, y, and z coordinates, color data, lighting data and texture map information may be included for each vertex.

In addition to the vertex data, draw process 232 (which may be performed by rendering units 150A–D) also receives sample coordinates from a sample position memory 234. In one embodiment, position memory 234 is embodied within rendering units 150A–D. In another embodiment, position memory 234 may be realized as part of texture and render memories 152A–152D, or as a separate memory. Sample position memory 234 is configured to store position information for samples that are calculated in draw process 232 and then stored into super-sampled sample buffer 162. In one embodiment, position memory 234 may be configured to store entire sample addresses. However, this may involve increasing the size of position memory 234. Alternatively, position memory 234 may be configured to store only x- and y-offsets for the samples. Storing only the offsets may use less storage space than storing each sample's entire position. The offsets may be relative to bin coordinates or relative to positions on a regular grid. The sample position information stored in sample position memory 234 may be read by a dedicated sample position calculation unit (not shown) and processed to calculate example sample positions for graphics processor 90. More detailed information on sample position offsets is included below (see description of FIGS. 14 and 15).

In another embodiment, sample position memory 234 may be configured to store a table of random numbers. Sample position memory 234 may also comprise dedicated hardware to generate one or more different types of regular grids. This hardware may be programmable. The stored random numbers may be added as offsets to the regular grid positions generated by the hardware. In one embodiment, the sample position memory may be programmable to access or "unfold" the random number table in a number of different ways. This may allow a smaller table to be used without visual artifacts caused by repeating sample position offsets. In one embodiment, the random numbers may be repeatable, thereby allowing draw process 232 and sample-to-pixel calculation process 240 to utilize the same offset for the same sample without necessarily storing each offset.

As shown in the figure, sample position memory 234 may be configured to store sample offsets generated according to a number of different schemes such as a regular square grid, a regular hexagonal grid, a perturbed regular grid, or a random (stochastic) distribution. Graphics system 112 may receive an indication from the operating system, device driver, or the geometry data 230 that indicates which type of sample positioning scheme is to be used. Thus the sample position memory 234 is configurable or programmable to generate position information according to one or more different schemes. More detailed information on several sample position schemes are described further below (see description of FIG. 14).

In one embodiment, sample position memory 234 may comprise a RAM/ROM that contains stochastic sample points (or locations) for different total sample counts per bin. As used herein, the term "bin" refers to a region or area in screen-space and contains however many samples are in that area (e.g., the bin may be 1×1 pixels in area, 2×2 pixels in area, etc.). The use of bins may simplify the storage and access of samples in sample buffer 162. A number of different bin sizes may be used (e.g., one sample per bin, four samples per bin, etc.). In the preferred embodiment, each bin has an xy-position that corresponds to a particular location on the display. The bins are preferably regularly spaced. In this embodiment the bins' xy-positions may be determined from the bin's storage location within sample buffer 162. The bins' positions correspond to particular positions on the display. In some embodiments, the bin positions may correspond to pixel centers, while in other embodiments the bin positions correspond to points that are located between pixel centers. The specific position of each sample within a bin may be determined by looking up the sample's offset in the RAM/ROM table (the offsets may be stored relative to the corresponding bin position). However, depending upon the implementation, not all bin sizes may have a unique RAM/ROM entry. Some bin sizes may simply read a subset of the larger bin sizes' entries. In one embodiment, each supported size has at least four different sample position scheme variants, which may reduce final image artifacts due to repeating sample positions.

In one embodiment, position memory 234 may store pairs of 8-bit numbers, each pair comprising an x-offset and a y-offset (other possible offsets are also possible, e.g., a time offset, a z-offset, etc.). When added to a bin position, each pair defines a particular position in screen space. The term "screen space" refers generally to the coordinate system of the display device. To improve read times, memory 234 may be constructed in a wide/parallel manner so as to allow the memory to output more than one sample location per clock cycle.

Once the sample positions have been read from sample position memory 234, draw process 232 selects the samples positions that fall within the polygon currently being rendered. Draw process 232 then calculates the z and color information (which may include alpha or other depth of field information values) for each of these samples and stores the data into sample buffer 162. In one embodiment, the sample buffer may only single-buffer z values (and perhaps alpha values) while double buffering other sample components such as color. Unlike prior art systems, graphics system 112 may double buffer all samples (although not all sample components may be double-buffered, i.e., the samples may have components that are not double-buffered, or not all samples may be double-buffered). In one embodiment, the samples are stored into sample buffer 162 in bins. In some embodiments, the size of bins, i.e., the quantity of samples within a bin, may vary from frame to frame and may also vary across different regions of display device 84 within a single frame. For example, bins along the edges of display device may comprise only one sample, while bins corresponding to pixels near the center of display device 84 may comprise sixteen samples. Note the area of bins may vary from region to region. The use of bins will be described in greater detail below in connection with FIG. 16.

In parallel and independently of draw process 232, filter process 240 is configured to read samples from sample buffer 162, filter (i.e., filter) them, and then output the resulting output pixel to display device 84. Sample-to-pixel calculation units 170 implement filter process 240. Thus, for at least a subset of the output pixels, the filter process is operable to filter a plurality of samples to produce a respective output pixel. In one embodiment, filter process 240 is configured to: (i) determine the distance from each sample to the center of the output pixel being filtered; (ii) multiply the sample's components (e.g., color and alpha) with a filter value that is a specific (programmable) function of the distance; (iii) sum all the weighted samples that contribute to the output pixel, and (iv) normalize the resulting output pixel. The filter process 240 is described in greater detail below (see description accompanying FIGS. 17 and 18). Note the extent of the filter need not be circular (i.e., it may be a function of x and y instead of the distance), but even if the extent is, the filter need not be circularly symmetrical. The filter's "extent" is the area within which samples can influence the particular pixel being calculated with the filter.

Turning now to FIG. 13, a diagram illustrating an alternate embodiment of graphics system 112 is shown. In this embodiment, two or more sample position memories 234A and 234B are utilized. Thus, the sample position memories 234A–B are essentially double-buffered. If the sample positions are kept the same from frame to frame, then the sample positions may be single buffered. However, if the sample positions may vary from frame to frame, then graphics system 112 may be advantageously configured to double-buffer the sample positions. The sample positions may be double buffered on the rendering side (i.e., memory 234A may be double buffered) and or the filter/convolve side (i.e., memory 234B may be double buffered). Other combinations are also possible. For example, memory 234A may be single-buffered, while memory 234B is doubled buffered. This configuration may allow one side of memory 234B to be used for refreshing (i.e., by filter/convolve process 240) while the other side of memory 234B is used being updated. In this configuration, graphics system 112 may change sample position schemes on a per-frame basis by shifting the sample positions (or offsets) from memory 234A to double-buffered memory 234B as each frame is rendered. Thus, the positions used to calculate the samples (read from memory 323A) are copied to memory 323B for use during the filtering process (i.e., the sample-to-pixel conversion process). Once the position information has been copied to memory 323B, position memory 323A may then be loaded with new sample position offsets to be used for the second frame to be rendered. In this way the sample position information follows the samples from the draw/render process to the filter process.

Yet another alternative embodiment may store tags to offsets with the samples themselves in super-sampled sample buffer 162. These tags may be used to look-up the offset/perturbation associated with each particular sample.
Sample Positioning Schemes—FIG. 14

FIG. 14 illustrates a number of different sample positioning schemes. In regular grid positioning scheme 190, each sample is positioned at an intersection of a regularly-spaced grid. Note however, that as used herein the term "regular grid" is not limited to square grids. Other types of grids are also considered "regular" as the term is used herein, including, but not limited to, rectangular grids, hexagonal grids, triangular grids, logarithmic grids, and semi-regular lattices such as Penrose tiling.

Perturbed regular grid positioning scheme 192 is based upon the previous definition of a regular grid. However, the samples in perturbed regular grid scheme 192 may be offset from their corresponding grid intersection. In one embodiment, the samples may be offset by a random angle (e.g., from 0° to 360°) and a random distance, or by random x and y offsets, which may or may not be limited to a predetermined range. The offsets may be generated in a number of ways, e.g., by hardware based upon a small number of seeds, looked up from a table, or by using a pseudo-random function. Once again, perturbed regular gird scheme 192 may be based on any type of regular grid (e.g., square, or hexagonal). A rectangular or hexagonal perturbed grid may be particularly desirable due to the geometric properties of these grid types.

Stochastic sample positioning scheme 194 represents a third potential type of scheme for positioning samples. Stochastic sample positioning involves randomly distributing the samples across a region (e.g., the displayed region on a display device or a particular window). Random positioning of samples may be accomplished through a number of different methods, e.g., using a random number generator such as an internal clock to generate pseudo-random numbers. Random numbers or positions may also be pre-calculated and stored in memory.

Figure 15:
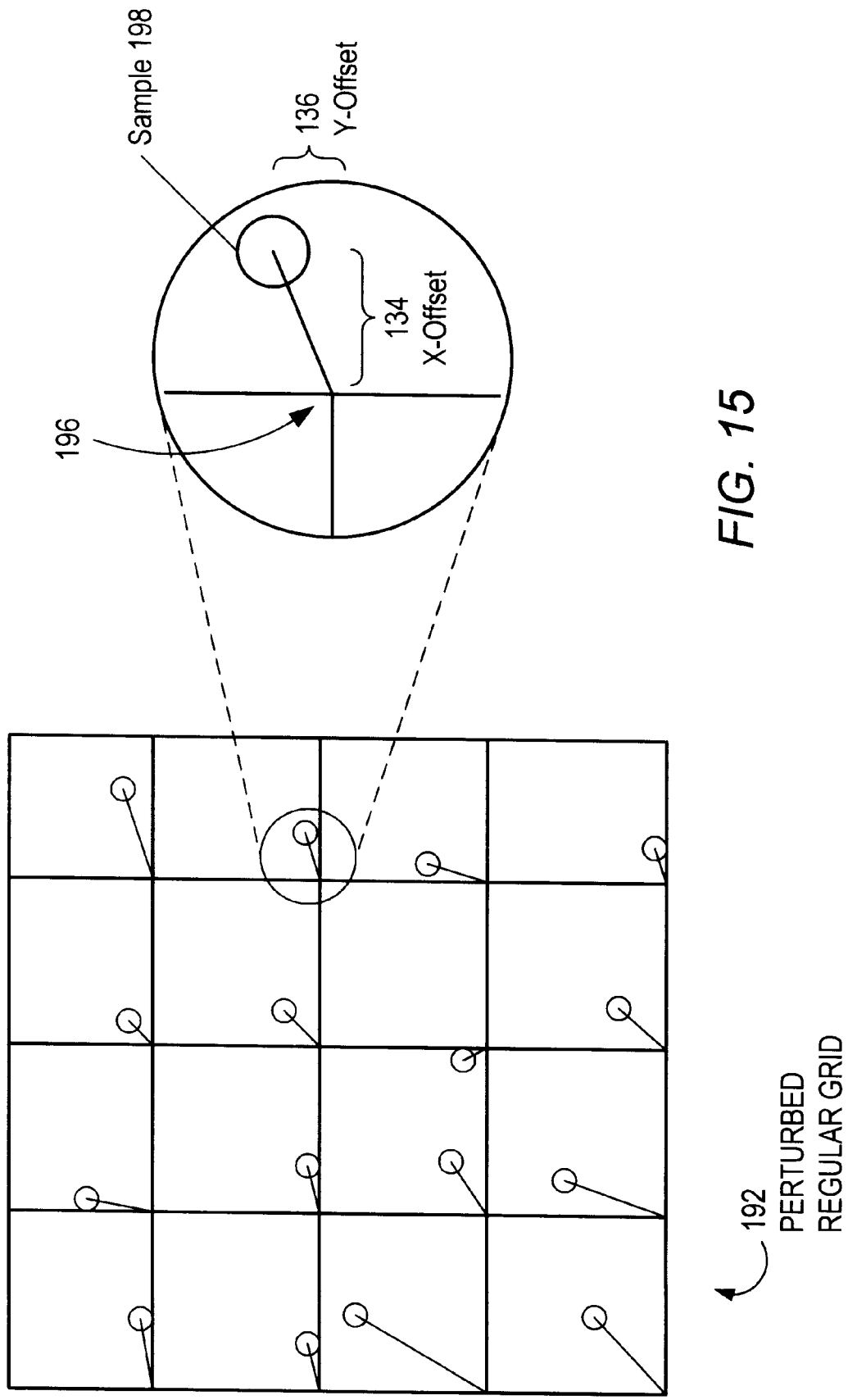
FIG. 15 is a diagram illustrating details of one embodiment of a sample positioning scheme.

Turning now to FIG. 15, details of one embodiment of perturbed regular grid scheme 192 are shown. In this embodiment, samples are randomly offset from a regular square grid by x- and y-offsets. As the enlarged area shows, sample 198 has an x-offset 134 that specifies its horizontal displacement from its corresponding grid intersection point 196. Similarly, sample 198 also has a y-offset 136 that specifies its vertical displacement from grid intersection point 196. The random offset may also be specified by an angle and distance. As with the previously disclosed embodiment that utilized angles and distances, x-offset 134 and y-offset 136 may be limited to a particular minimum and or maximum value or range of values.

Figure 16:
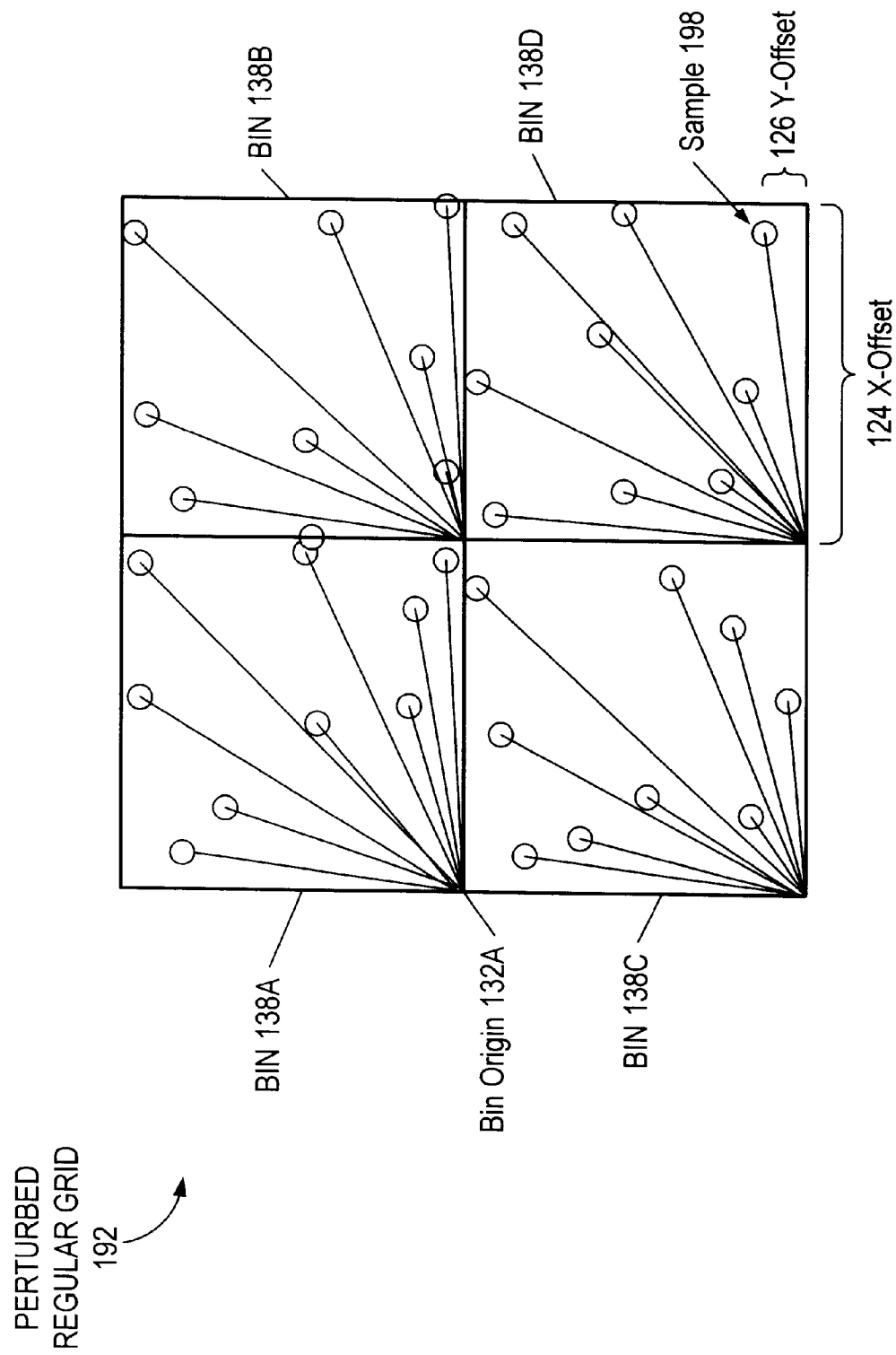
FIG. 16 is a diagram illustrating details of another embodiment of a sample positioning scheme.

Turning now to FIG. 16, details of another embodiment of perturbed regular grid scheme 192 are shown. In this embodiment, the samples are grouped into "bins" 138A–D. In this embodiment, each bin comprises nine (i.e., 3×3) samples. Different bin sizes may be used in other embodiments (e.g., bins storing 2×2 samples or 4×4 samples). In the embodiment shown, each sample's position is determined as an offset relative to the position of the bin. The position of the bins may be defined as any convenient position related to the grid, e.g., the lower left-hand corners 132A–D as shown in the figure. For example, the position of sample 198 is determined by summing x-offset 124 and y-offset 126 to the x and y coordinates of the corner 132D of bin 138D. As previously noted, this may reduce the size of the sample position memory used in some embodiments.

Figure 17A:
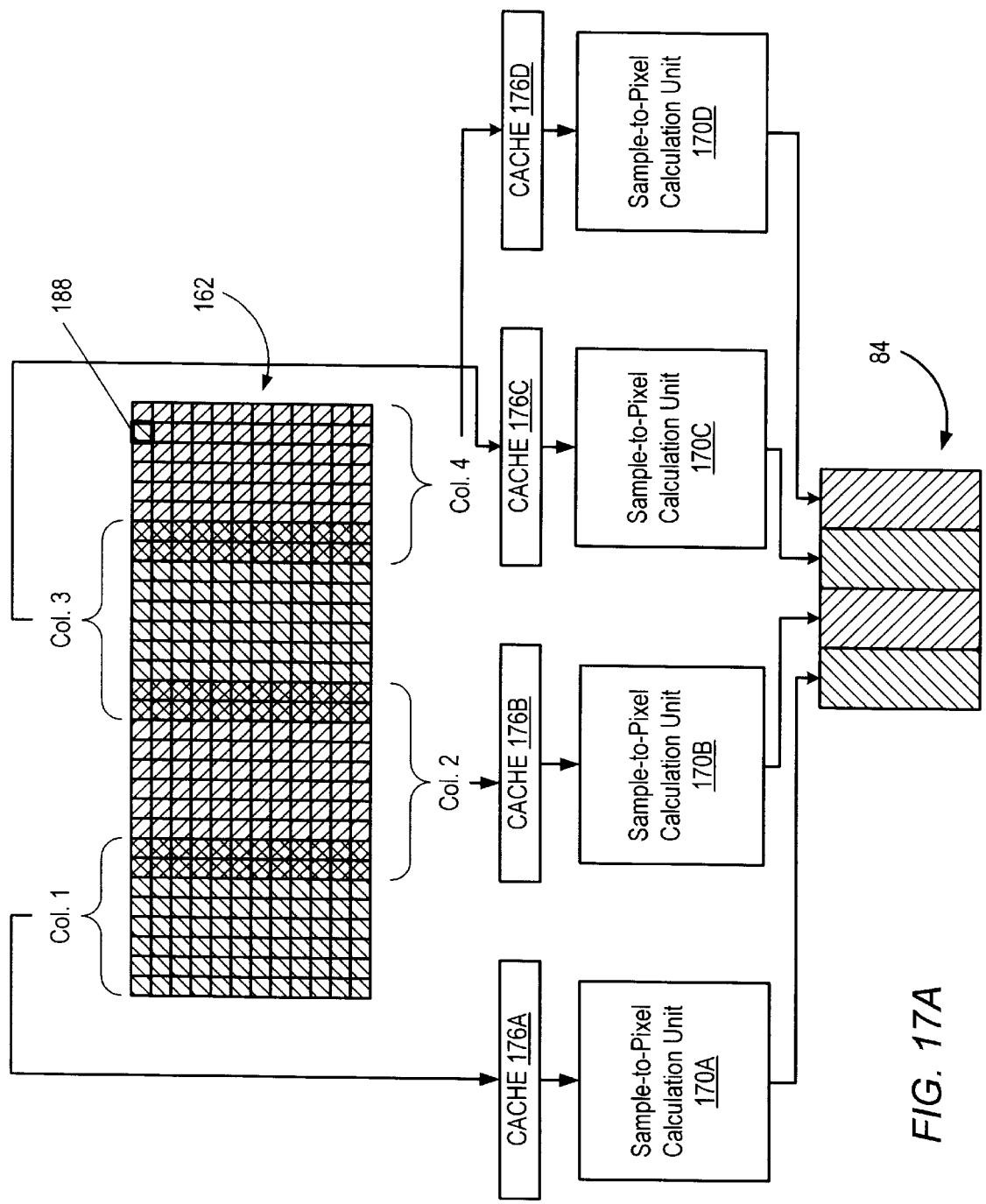
FIGS. 17A–B are diagrams illustrating details of one embodiment of a method of converting (filtering) samples to pixels.

Turning now to FIG. 17A, one possible method for rapidly converting samples stored in sample buffer 162 into pixels is shown. In this embodiment, the contents of sample buffer 162 are organized into columns (e.g., Cols. 1–4). Each column in sample buffer 162 may comprise a two-dimensional array of bins. The columns may be configured to horizontally overlap (e.g., by one or more bins), and each column may be assigned to a particular sample-to-pixel calculation unit 170A–D for the convolution process. The amount of the overlap may depend upon the extent of the filter being used. The example shown in the figure illustrates an overlap of two bins (each square such as square 188 represents a single bin comprising one or more samples). Advantageously, this configuration may allow sample-to-pixel calculation units 170A–D to work independently and in parallel, with each sample-to-pixel calculation unit 170A–D receiving and converting its own column. Overlapping the columns will eliminate visual bands or other artifacts appearing at the column boundaries for any operators larger than a pixel in extent.

Figure 17B:
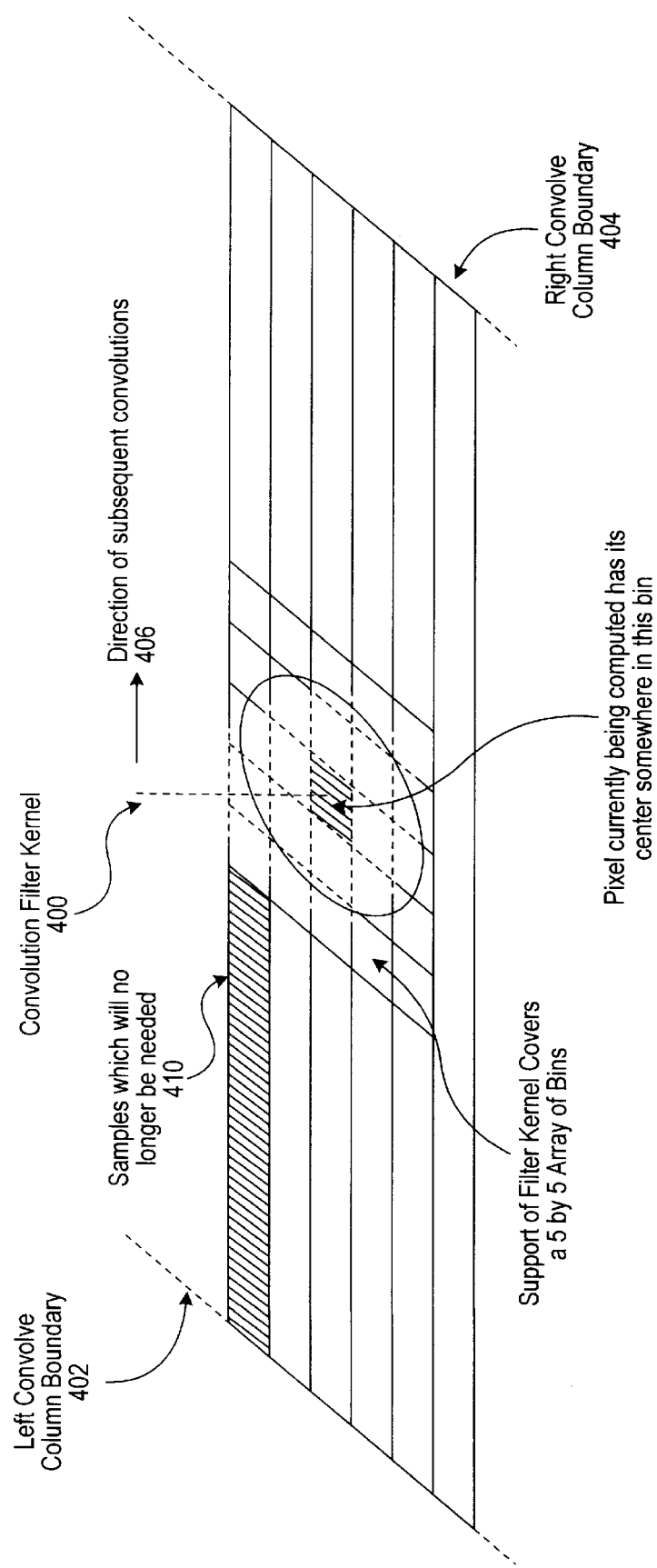

Turning now to FIG. 17B, more details of one embodiment of a method for reading the samples from a super-sampled sample buffer are shown. As the figure illustrates, the convolution filter kernel 400 travels across column 414 (see arrow 406) to generate output pixels. One or more sample-to-pixel calculation units 170 may implement the convolution filter kernel 400. A bin cache 408 may used to provide quick access to the samples that may potentially contribute to the output pixel. As the convolution process proceeds, bins are read from the super-sampled sample buffer and stored in bin cache 408. In one embodiment, bins that are no longer needed 410 are overwritten in the cache by new bins 412. As each pixel is generated, convolution filter kernel 400 shifts. Kernel 400 may be visualized as proceeding in a sequential fashion within the column in the direction indicated by arrow 406. When kernel 400 reaches the end of the column, it may shift down one or more rows of samples and then proceed again. Thus the convolution process proceeds in a scan line manner, generating one column of output pixels for display.

Figure 18:
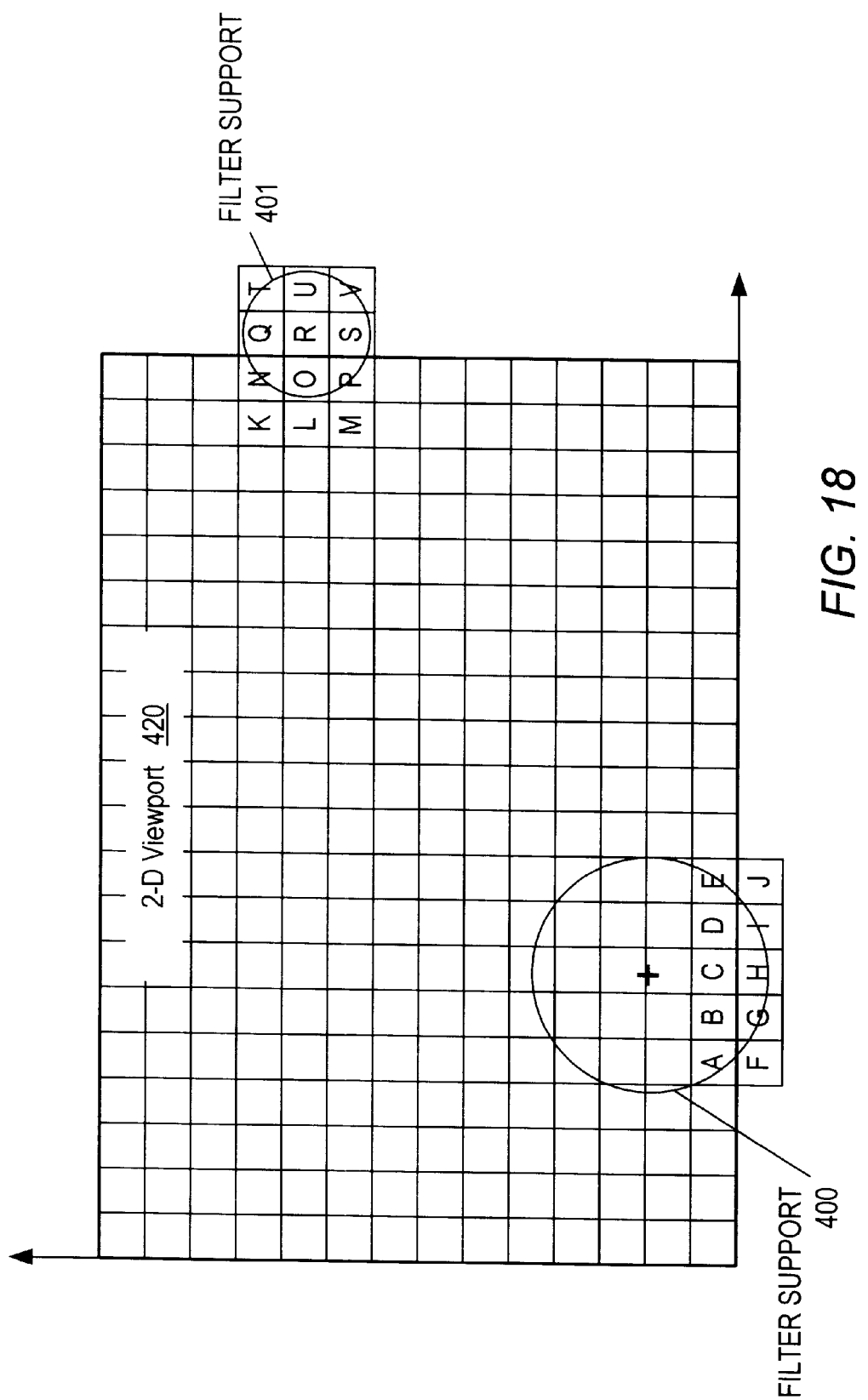
FIG. 18 is a diagram illustrating one method for dealing with edge cases when converting samples to pixels.

Turning now to FIG. 18, a diagram illustrating potential border conditions is shown. In one embodiment, the bins that fall outside of sample window 420 may be replaced with samples having predetermined background colors specified by the user. In another embodiment, bins that fall outside the window are not used by setting their weighting factors to zero (and then dynamically calculating normalization coefficients). In yet another embodiment, the bins at the inside edge of the window may be duplicated to replace those outside the window. This is indicated by outside bin 430 being replaced by mirror inside bin 432.

Figure 19:
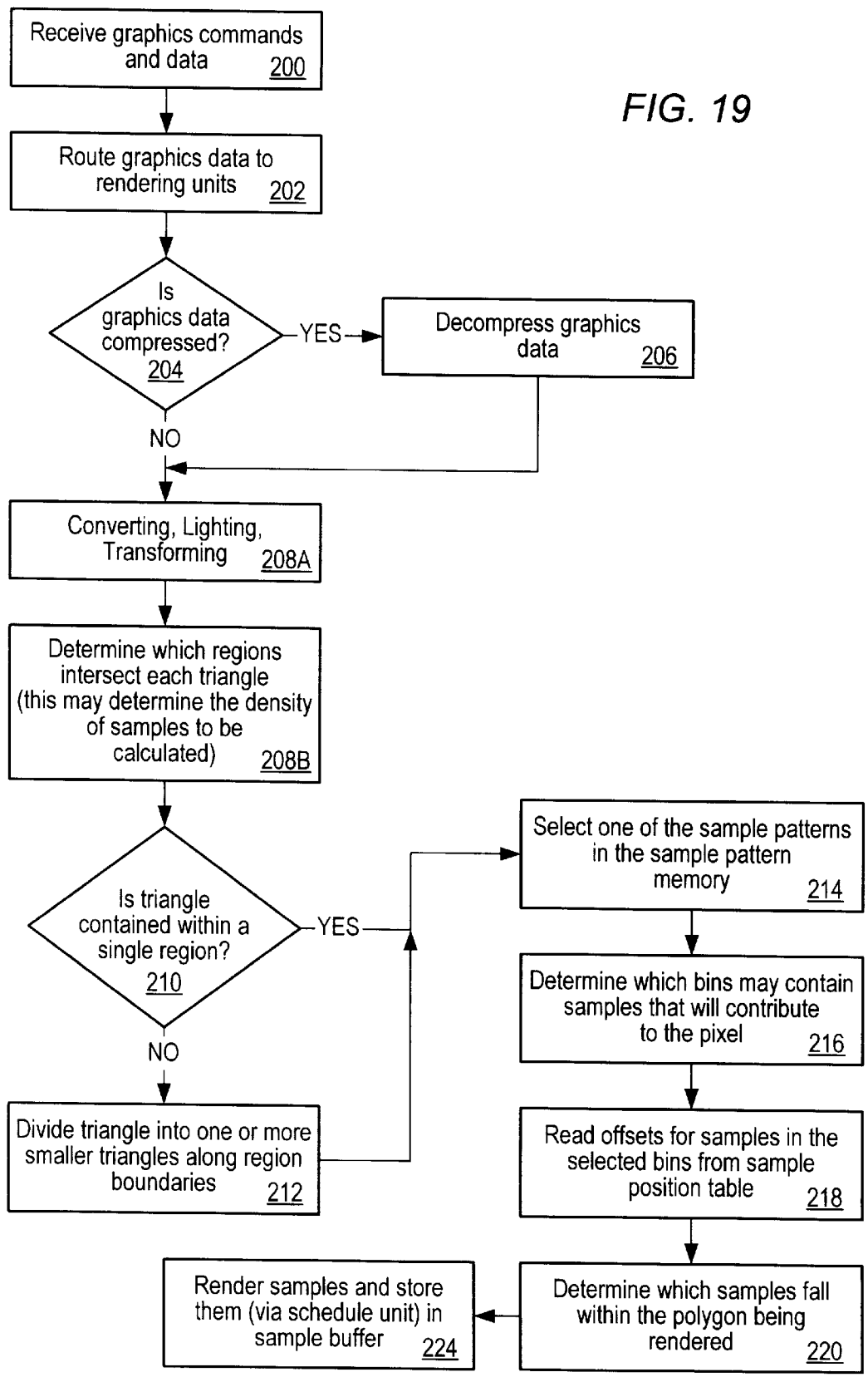
FIG. 19 is a flowchart illustrating one method for generating samples from three-dimensional graphics data.

FIG. 19 is a flowchart of one embodiment of a method for drawing or rendering sample pixels into a super-sampled sample buffer. Certain of the steps depicted in the figure may occur concurrently or in different orders. In this embodiment, the graphics system receives graphics commands and graphics data from the host CPU 102 or directly from main memory 106 (step 200). Next, the instructions and data are routed to one or more rendering units 150A–D (step 202). If the graphics data is compressed (step 204), then the rendering units 150A–D decompress the data into a useable format, e.g., triangles (step 206). Next, the triangles are processed, e.g., converted to screen space, lit, and transformed (step 208A). If the graphics system implements variable resolution super sampling, then the triangles are compared with the sample density region boundaries (step 208B). In variable-resolution super-sampled sample buffer implementations, different regions of the display device may be allocated different sample densities based upon a number of factors (e.g., the center of the attention on the screen as determined by eye or head tracking). Sample density regions are described in greater detail below (see section entitled Variable Resolution Sample buffer below). If the triangle crosses a region boundary (step 210), then the triangle may be divided into two smaller polygons along the region boundary (step 212). This may allow each newly formed triangle to have a single sample density. In one embodiment, the graphics system may be configured to simply use the entire triangle twice (i.e., once in each region) and then use a bounding box to effectively clip the triangle.

Next, one of the sample position schemes (e.g., regular grid, perturbed regular grid, or stochastic) are selected from the sample position memory 184 (step 214). The sample position scheme will generally have been pre-programmed into the sample position memory 184, but may also be selected "on the fly". Based upon this sample position scheme and the sample density of the region containing the triangle, rendering units 150A–D determine which bins may contain samples located within the triangle's boundaries (step 216). The offsets for the samples within these bins are then read from sample position memory 184 (step 218). Each sample's position is then calculated using the offsets and is compared with the triangle's vertices to determine if the sample is within the triangle (step 220). Step 220 is discussed in greater detail below.

For each sample that is determined to be within the triangle, the rendering unit draws the sample by calculating the sample's color, alpha and other attributes. This may involve lighting calculation and interpolation based upon the color and texture map information associated with the vertices of the triangle. Once the sample is rendered, it may be forwarded to schedule unit 154, which then stores the sample in sample buffer 162 (step 224).

Note the embodiment of the method described above is used for explanatory purposes only and is not meant to be limiting. For example, in some embodiments the steps shown in the figure as occurring serially may be implemented in parallel. Furthermore, some steps may be reduced or eliminated in certain embodiments of the graphics system (e.g., steps 204–206 in embodiments that do not implement geometry compression or steps 210–212 in embodiments that do not implement a variable resolution super-sampled sample buffer).

Determination of Which Samples Reside within the Polygon Being Rendered

The comparison may be performed in a number of different ways. In one embodiment, the deltas between the three vertices defining the triangle are first determined. For example, these deltas may be taken in the order of first to second vertex (v2−v1)=d12, second to third vertex (v3−v2)=d23, and third vertex back to the first vertex (v1−v3)=d31. These deltas form vectors, and each vector may be categorized as belonging to one of the four quadrants of the coordinate plane (e.g., by using the two sign bits of its delta X and Y coefficients). A third condition may be added determining whether the vector is an X-major vector or Y-major vector. This may be determined by calculating whether abs(delta_x) is greater than abs(delta_y).

Figure 20:
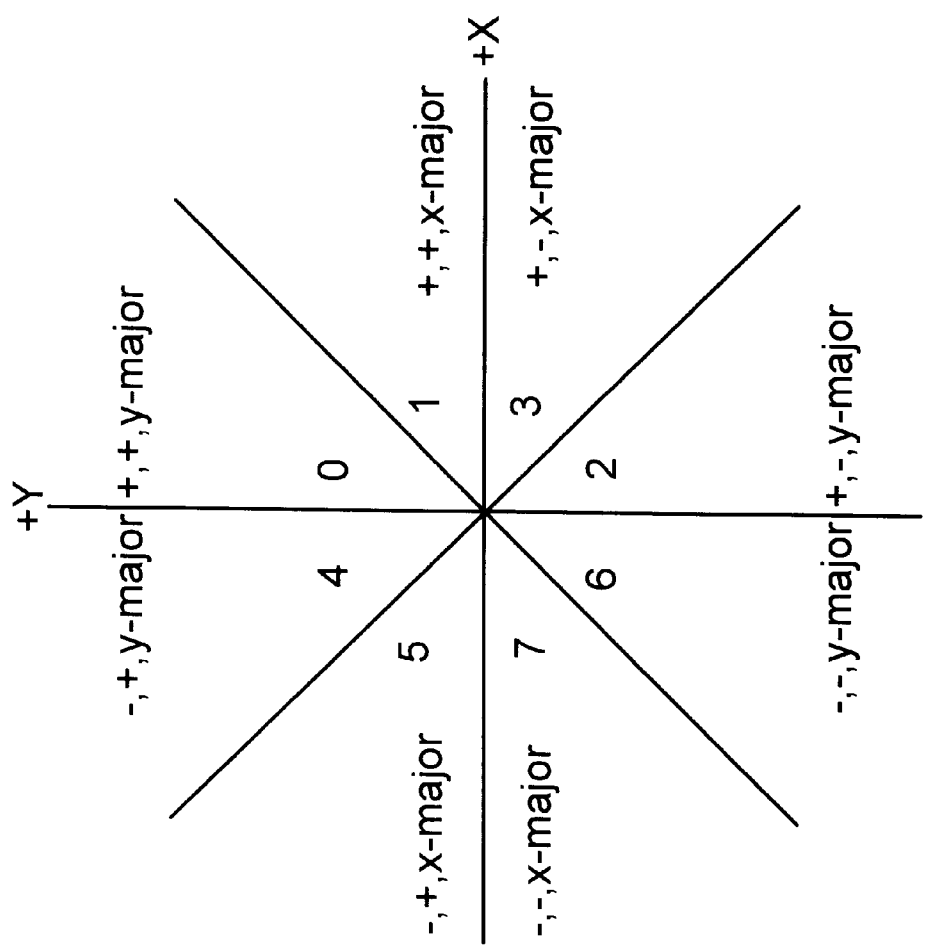
FIG. 20 is a diagram illustrating one embodiment for coding triangle vertices.

Using these three bits of information, the vectors may each be categorized as belonging to one of eight different regions of the coordinate plane. If three bits are used to define these regions, then the X-sign bit (shifted left by two), the Y-sign bit (shifted left by one), and the X-major bit, may be used to create the eight regions as shown in FIG. 20.

Next, three edge equations may be used to define the inside portion of the triangle. These edge equations (or half-plane equations) may be defined using slope-intercept form. To reduce the numerical range needed, both X-major and Y-major equation forms may be used (such that the absolute value of the slope value may be in the range of 0 to 1). Thus, the two edge equations are:

X-major: $y-m \cdot x-b<0$, when the point is below the line

Y-major: $x-m \cdot y-b<0$, when the point is to the left of the line

The X-major equations produces a negative versus positive value when the point in question is below the line, while the Y-major equation produces a negative versus positive value when the point in question is to the left of the line. Since which side of the line is the "accept" side is known, the sign bit (or the inverse of the sign bit) of the edge equation result may be used to determine whether the sample is on the "accept" side or not. This is referred to herein as the "accept bit". Thus, a sample is on the accept side of a line if:

X-major: $(y-m \cdot x-b<0)$<xor>accept

Y-major: $(y-m \cdot x-b<0)$<xor>accept

The accept bit may be calculated according to the following table, wherein cw designates whether the triangle is clockwise (cw=1) or counter-clockwise (cw=0):

1: accept=!cw
0: accept=cw
4: accept=cw
5: accept=cw
7: accept=cw
6: accept=!cw
2: accept=!cw
3: accept=!cw Tie breaking rules for this representation may also be implemented (e.g., coordinate axes may be defined as belonging to the positive octant). Similarly, X-major may be defined as owning all points that tie on the slopes.

In an alternate embodiment, the accept side of an edge may be determined by applying the edge equation to the third vertex of the triangle (the vertex that is not one of the two vertices forming the edge). This method may incur the additional cost of a multiply-add, which may not be used by the technique described above.

To determine the "faced-ness" of a triangle (i.e., whether the triangle is clockwise or counter-clockwise), the delta-directions of two edges of the triangle may be checked and the slopes of the two edges may be compared. For example, assuming that edge12 has a delta-direction of 1 and the second edge (edge23) has a delta-direction of 0, 4, or 5, then the triangle is counter-clockwise. If, however, edge23 has a delta-direction of 3, 2, or 6, then the triangle is clockwise. If edge23 has a delta-direction of 1 (i.e., the same as edge12), then comparing the slopes of the two edges breaks the tie (both are x-major). If edge12 has a greater slope, then the triangle is counter-clockwise. If edge23 has a delta-direction of 7 (the exact opposite of edge 12), then again the slopes are compared, but with opposite results in terms of whether the triangle is clockwise or counter-clockwise.

The same analysis can be exhaustively applied to all combinations of edge12 and edge23 delta-directions, in every case determining the proper faced-ness. If the slopes are the same in the tie case, then the triangle is degenerate (i.e., with no interior area). It can be explicitly tested for and culled, or, with proper numerical care, it could be let through as it will cause no pixels to render. One special case is when a triangle splits the view plane, but that may be detected earlier in the pipeline (e.g., when front plane and back plane clipping are performed).

Note in most cases only one side of a triangle is rendered. Thus, after the faced-ness of a triangle is determined, if the face is the one to be rejected, then the triangle can be culled (i.e., subject to no further processing with no pixels generated). Further note that this determination of faced-ness only uses one additional comparison (i.e., of the slope of edge12 to that of edge23) beyond factors already computed. Many traditional approaches may utilize more complex computation (though at earlier stages of the set-up computation).

Figure 21:
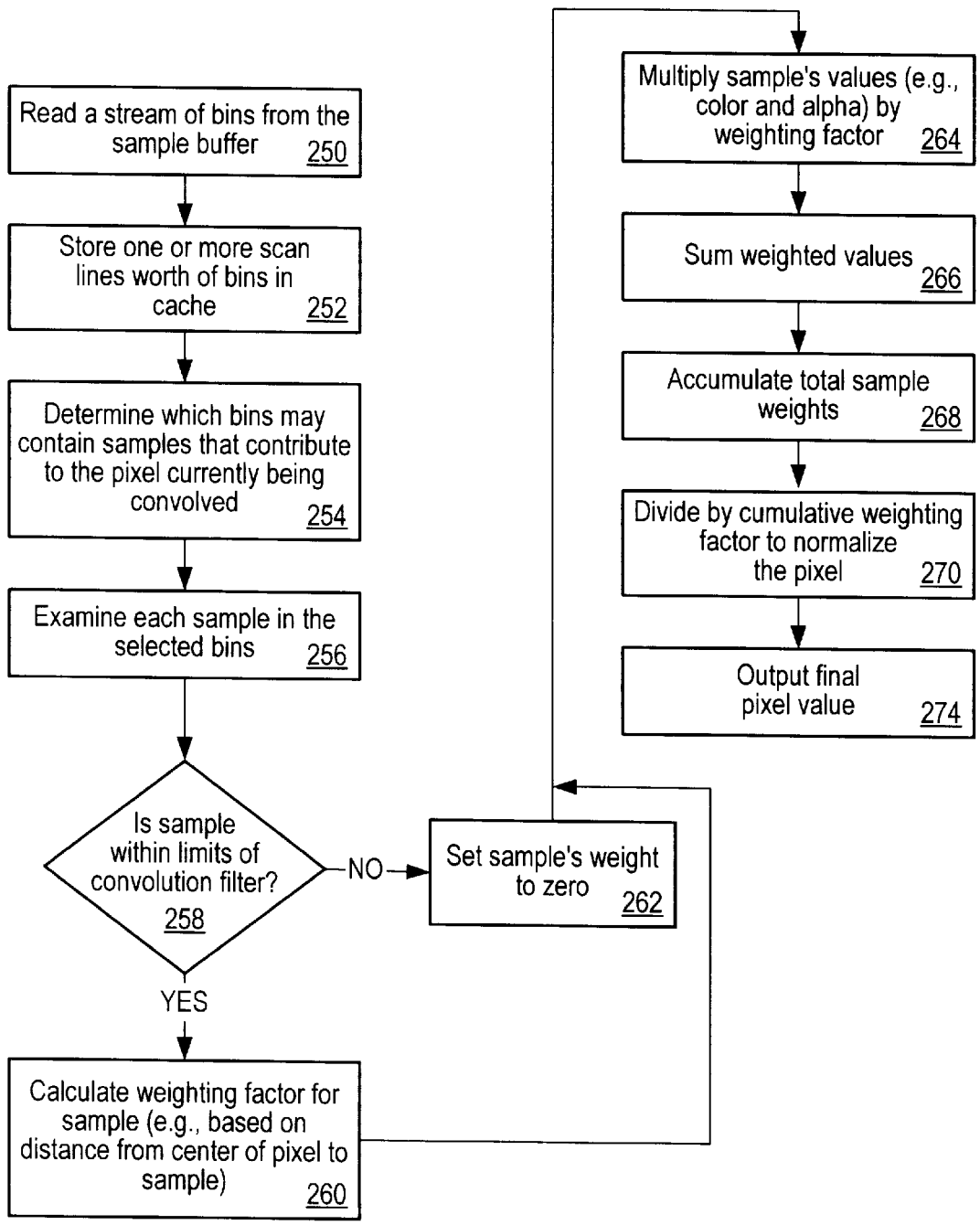
FIG. 21 is a diagram illustrating one embodiment of a method for calculating pixels from samples.

FIG. 21 is a flowchart of one embodiment of a method for filtering samples stored in the super-sampled sample buffer to generate output pixels. First, a stream of bins are read from the super-sampled sample buffer (step 250). These may be stored in one or more caches to allow the sample-to-pixel calculation units 170 easy access during the convolution process (step 252). Next, the bins are examined to determine which may contain samples that contribute to the output pixel currently being generated by the filter process (step 254). Each sample that is in a bin that may contribute to the output pixel is then individually examined to determine if the sample does indeed contribute (steps 256–258). This determination may be based upon the distance from the sample to the center of the output pixel being generated.

In one embodiment, the sample-to-pixel calculation units 170 may be configured to calculate this distance (i.e., the extent of the filter at sample's position) and then use it to index into a table storing filter weight values according to filter extent (step 260). In another embodiment, however, the potentially expensive calculation for determining the distance from the center of the pixel to the sample (which typically involves a square root function) is avoided by using distance squared to index into the table of filter weights. Alternatively, a function of x and y may be used in lieu of one dependent upon a distance calculation. In one embodiment, this may be accomplished by utilizing a floating point format for the distance (e.g., four or five bits of mantissa and three bits of exponent), thereby allowing much of the accuracy to be maintained while compensating for the increased range in values. In one embodiment, the table may be implemented in ROM. However, RAM tables may also be used. Advantageously, RAM tables may, in some embodiments, allow the graphics system to vary the filter coefficients on a per-frame basis. For example, the filter coefficients may be varied to compensate for known shortcomings of the display or for the user's personal preferences. The graphics system can also vary the filter coefficients on a screen area basis within a frame, or on a per-output pixel basis. Another alternative embodiment may actually calculate the desired filter weights for each sample using specialized hardware (e.g., multipliers and adders). The filter weight for samples outside the limits of the convolution filter may simply be multiplied by a filter weight of zero (step 262), or they may be removed from the calculation entirely.

Once the filter weight for a sample has been determined, the sample may then be multiplied by its filter weight (step 264). The weighted sample may then be summed with a running total to determine the final output pixel's color value (step 266). The filter weight may also be added to a running total pixel filter weight (step 268), which is used to normalize the filtered pixels. Normalization advantageously prevents the filtered pixels (e.g., pixels with more samples than other pixels) from appearing too bright or too dark by compensating for gain introduced by the convolution process. After all the contributing samples have been weighted and summed, the total pixel filter weight may be used to divide out the gain caused by the filtering (step 270). Finally, the normalized output pixel may be output for gamma correction, digital-to-analog conversion (if necessary), and eventual display (step 274).

FIG. 22 illustrates a simplified example of an output pixel convolution. As the figure shows, four bins 288A–D contain samples that may possibly contribute to the output pixel. In this example, the center of the output pixel is located at the boundary of bins 288A–288D. Each bin comprises sixteen samples, and an array of 2 four bins (2×2) is filtered to generate the output pixel. Assuming circular filters are used, the distance of each sample from the pixel center determines which filter value will be applied to the sample. For example, sample 296 is relatively close to the pixel center, and thus falls within the region of the filter having a filter value of 8. Similarly, samples 294 and 292 fall within the regions of the filter having filter values of 4 and 2, respectively. Sample 290, however, falls outside the maximum filter extent, and thus receives a filter value of 0. Thus sample 290 will not contribute to the output pixel's value. This type of filter ensures that the samples located the closest to the pixel center will contribute the most, while pixels located the far from the pixel center will contribute less to the final output pixel values. This type of filtering automatically performs anti-aliasing by smoothing any abrupt changes in the image (e.g., from a dark line to a light background). Another particularly useful type of filter for anti-aliasing is a windowed sinc filter. Advantageously, the windowed sinc filter contains negative lobes that resharpen some of the blended or "fuzzed" image. Negative lobes are areas where the filter causes the samples to subtract from the pixel being calculated. In contrast samples on either side of the negative lobe add to the pixel being calculated.

Example values for samples 290–296 are illustrated in boxes 300–308. In this example, each sample comprises red, green, blue and alpha values, in addition to the sample's positional data. Block 310 illustrates the calculation of each pixel component value for the non-normalized output pixel. As block 310 indicates, potentially undesirable gain is introduced into the final pixel values (i.e., an out pixel having a red component value of 2000 is much higher than any of the sample's red component values). As previously noted, the filter values may be summed to obtain normalization value 308. Normalization value 308 is used to divide out the unwanted gain from the output pixel. Block 312 illustrates this process and the final normalized example pixel values.

Note the values used herein were chosen for descriptive purposes only and are not meant to be limiting. For example, the filter may have a large number of regions each with a different filter value. In one embodiment, some regions may have negative filter values. The filter utilized may be a continuous function that is evaluated for each sample based on the sample's distance from the pixel center. Also note that floating point values may be used for increased precision. A variety of filters may be utilized, e.g., cylinder, cone, Gaussian, Catmull-Rom, windowed sinc, Mitchell-Netravalli filter, box, tent.

Full-Screen Anti-aliasing

The vast majority of current 3D graphics systems only provide real-time anti-aliasing for lines and dots. While some systems also allow the edge of a polygon to be "fuzzed", this technique typically works best when all polygons have been pre-sorted in depth. This may defeat the purpose of having general-purpose 3D rendering hardware for most applications (which do not depth pre-sort their polygons). In one embodiment, graphics system 112 may be configured to implement full-screen anti-aliasing by stochastically sampling up to sixteen samples per output pixel, filtered by a 4×4-convolution filter.

Variable Resolution Super-Sampling

Currently, the straight-forward brute force method of utilizing a fixed number of samples per pixel location, e.g., an 8× super-sampled sample buffer, would entail the use of eight times more memory, eight times the fill rate (i.e., memory bandwidth), and a convolution pipe capable of processing eight samples per pixel. Given the high resolution and refresh rates of current displays, a graphics system of this magnitude may be relatively expense to implement given today's level of integration.

In one embodiment, graphics system 112 may be configured to overcome these potential obstacles by implementing variable resolution super-sampling. In this embodiment, graphics system 112 mimics the human eye's characteristics by allocating a higher number of samples per pixel at one or more first locations on the screen (e.g., the point of foveation on the screen), with a drop-off in the number of samples per pixel for one or more second locations on the screen (e.g., areas farther away from the point of foveation). Depending upon the implementation, the point of foveation may be determined in a variety of ways. In one embodiment, the point of foveation may be a predetermined area around a certain object displayed upon the screen. For example, the area around a moving cursor or the main character in a computer game may be designated the point of foveation. In another embodiment, the point of foveation on the screen may be determined by head-tracking or eye-tracking. Even if eye/head/hand-tracking, cursor-based, or main character-based points of foveation are not implemented, the point of foveation may be fixed at the center of the screen, where the majority of viewer's attention is focused the majority of the time. Variable resolution super-sampling is described in greater detail below.

Variable-Resolution Super-Sampled Sample Buffer—FIGS. 23–25

A traditional frame buffer is one rectangular array of uniformly sampled pixels. For every pixel on the final display device (CRT or LCD), there is a single pixel or location of memory storage in the frame buffer (perhaps double buffered). There is a trivial one-to-one correspondence between the 2D memory address of a given pixel and its 2D sample address for the mathematics of rendering. Stated another way, in a traditional frame buffer there is no separate notion of samples apart from the pixels themselves. The output pixels are stored in a traditional frame buffer in a row/column manner corresponding to how the pixels are provided to the display during display refresh.

In a variable-resolution super-sampled sample buffer, the number of computed samples per output pixel varies on a regional basis. Thus, output pixels in regions of greater interest are computed using a greater number of samples, thus producing greater resolution in this region, and output pixels in regions of lesser interest are computed using a lesser number of samples, thus producing lesser resolution in this region.

As previously noted, in some embodiments graphic system 112 may be configured with a variable resolution super-sampled sample buffer. To implement variable resolution super-sampling, sample buffer 162 may be divided into smaller pieces, called regions. The size, location, and other attributes of these regions may be configured to vary dynamically, as parameterized by run-time registers on a per-frame basis.

Figure 23A:
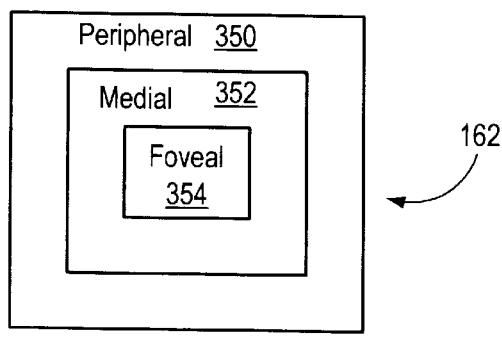
FIG. 23A is a diagram illustrating one embodiment of a method for dividing a super-sampled sample buffer into regions.

Turning now to FIG. 23A, a diagram of one possible scheme for dividing sample buffer 162 is shown. In this embodiment, sample buffer 162 is divided into the following three nested regions: foveal region 354, medial region 352, and peripheral region 350. Each of these regions has a rectangular shaped outer border, but the medial and the peripheral regions have a rectangular shaped hole in their center. Each region may be configured with certain constant (per frame) properties, e.g., a constant density sample density and a constant size of pixel bin. In one embodiment, the total density range may be 256, i.e., a region could support between one sample every 16 screen pixels (4×4) and 16 samples for every 1 screen pixel. In other embodiments, the total density range may be limited to other values, e.g., 64. In one embodiment, the sample density varies, either linearly or non-linearly, across a respective region. Note in other embodiments the display may be divided into a plurality of constant sized regions (e.g., squares that are 4×4 pixels in size or 40×40 pixels in size).

Figure 23B:
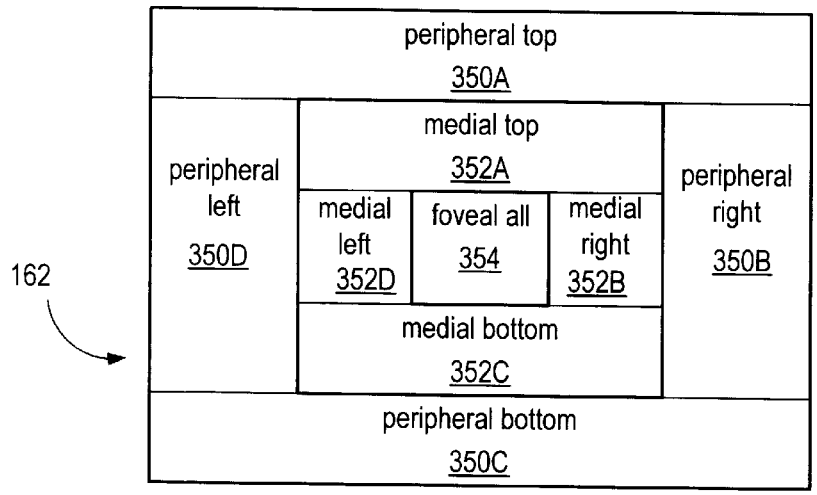
FIG. 23B is a diagram illustrating another embodiment of a method for dividing a super-sampled sample buffer into regions.

To simply perform calculations for polygons that encompass one or more region corners (e.g., a foveal region corner), the sample buffer may be further divided into a plurality of subregions. Turning now to FIG. 23B, one embodiment of sample buffer 162 divided into sub-regions is shown. Each of these sub-regions are rectangular, allowing graphics system 112 to translate from a 2D address with a sub-region to a linear address in sample buffer 162. Thus, in some embodiments each sub-region has a memory base address, indicating where storage for the pixels within the sub-region starts. Each sub-region may also have a "stride" parameter associated with its width.

Figure 23C:
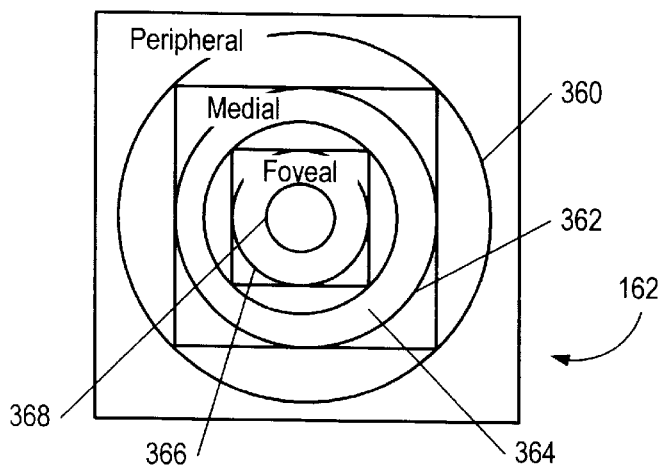
FIG. 23C is a diagram illustrating yet another embodiment of a method for dividing a super-sampled sample buffer into regions.

Another potential division of the super-sampled sample buffer is circular. Turning now to FIG. 23C, one such embodiment is illustrated. For example, each region may have two radii associated with it (i.e., 360–368), dividing the region into three concentric circular-regions. The circular-regions may all be centered at the same screen point, the fovea center point. Note however, that the fovea center-point need not always be located at the center of the foveal region. In some instances it may even be located off-screen (i.e., to the side of the visual display surface of the display device). While the embodiment illustrated supports up to seven distinct circular-regions, it is possible for some of the circles to be shared across two different regions, thereby reducing the distinct circular-regions to five or less.

The circular regions may delineate areas of constant sample density actually used. For example, in the example illustrated in the figure, foveal region 354 may allocate a sample buffer density of 8 samples per screen pixel, but outside the innermost circle 368, it may only use 4 samples per pixel, and outside the next circle 366 it may only use two samples per pixel. Thus, in this embodiment the rings need not necessarily save actual memory (the regions do that), but they may potentially save memory bandwidth into and out of the sample buffer (as well as pixel convolution bandwidth). In addition to indicating a different effective sample density, the rings may also be used to indicate a different sample position scheme to be employed. As previously noted, these sample position schemes may stored in an on-chip RAM/ROM, or in programmable memory.

As previously discussed, in some embodiments super-sampled sample buffer 162 may be further divided into bins. For example, a bin may store a single sample or an array of samples (e.g., 2×2 or 4×4 samples). In one embodiment, each bin may store between one and sixteen sample points, although other configurations are possible and contemplated. Each region may be configured with a particular bin size, and a constant memory sample density as well. Note that the lower density regions need not necessarily have larger bin sizes. In one embodiment, the regions (or at least the inner regions) are exact integer multiples of the bin size enclosing the region. This may allow for more efficient utilization of the sample buffer in some embodiments.

Variable-resolution super-sampling involves calculating a variable number of samples for each pixel displayed on the display device. Certain areas of an image may benefit from a greater number of samples (e.g., near object edges), while other areas may not need extra samples (e.g., smooth areas having a constant color and brightness). To save memory and bandwidth, extra samples may be used only in areas that may benefit from the increased resolution. For example, if part of the display is colored a constant color of blue (e.g., as in a background), then extra samples may not be particularly useful because they will all simply have the constant value (equal to the background color being displayed). In contrast, if a second area on the screen is displaying a 3D rendered object with complex textures and edges, the use of additional samples may be useful in avoiding certain artifacts such as aliasing. A number of different methods may be used to determine or predict which areas of an image would benefit from higher sample densities. For example, an edge analysis could be performed on the final image, and with that information being used to predict how the sample densities should be distributed. The software application may also be able to indicate which areas of a frame should be allocated higher sample densities.

A number of different methods may be used to implement variable-resolution super sampling. These methods tend to fall into the following two general categories: (1) those methods that concern the draw or rendering process, and (2) those methods that concern the convolution process. For example, samples may be rendered into the super-sampling sample buffer 162 using any of the following methods:

1) a uniform sample density;
2) varying sample density on a per-region basis (e.g., medial, foveal, and peripheral); and
3) varying sample density by changing density on a scan-line basis (or on a small number of scan lines basis).

Varying sample density on a scan-line basis may be accomplished by using a look-up table of densities. For example, the table may specify that the first five pixels of a particular scan line have three samples each, while the next four pixels have two samples each, and so on.

On the convolution (i.e., filtering) side, the following methods are possible:

1) a uniform convolution filter;
2) continuously variable convolution filter; and
3) a convolution filter operating at multiple spatial frequencies.

A uniform convolution filter may, for example, have a constant extent (or number of samples selected) for each pixel calculated. In contrast, a continuously variable convolution filter may gradually change the number of samples used to calculate a pixel. The function may be vary continuously from a maximum at the center of attention to a minimum in peripheral areas.

Different combinations of these methods (both on the rendering side and convolution side) are also possible. For example, a constant sample density may be used on the rendering side, while a continuously variable convolution filter may be used on the samples.

Different methods for determining which areas of the image will be allocated more samples per pixel are also contemplated. In one embodiment, if the image on the screen has a main focal point (e.g., a character like Mario in a computer game), then more samples may be calculated for the area around Mario and fewer samples may be calculated for pixels in other areas (e.g., around the background or near the edges of the screen).

In another embodiment, the viewer's point of foveation may be determined by eye/head/hand-tracking. In head-tracking embodiments, the direction of the viewer's gaze is determined or estimated from the orientation of the viewer's head, which may be measured using a variety of mechanisms. For example, a helmet or visor worn by the viewer (with eye/head tracking) may be used alone or in combination with a hand-tracking mechanism, wand, or eye-tracking sensor to provide orientation information to graphics system 112. Other alternatives include head-tracking using an infrared reflective dot placed on the user's forehead, or using a pair of glasses with head- and or eye-tracking sensors built in. One method for using head- and hand-tracking is disclosed in U.S. Pat. No. 5,446,834 (entitled "Method and Apparatus for High Resolution Virtual Reality Systems Using Head Tracked Display," by Michael Deering, issued Aug. 29, 1995), which is incorporated herein by reference in its entirety. Other methods for head tracking are also possible and contemplated (e.g., infrared sensors, electromagnetic sensors, capacitive sensors, video cameras, sonic and ultrasonic detectors, clothing based sensors, video tracking devices, conductive ink, strain gauges, force-feedback detectors, fiber optic sensors, pneumatic sensors, magnetic tracking devices, and mechanical switches).

As previously noted, eye-tracking may be particularly advantageous when used in conjunction with head-tracking. In eye-tracked embodiments, the direction of the viewer's gaze is measured directly by detecting the orientation of the viewer's eyes in relation to the viewer's head. This information, when combined with other information regarding the position and orientation of the viewer's head in relation to the display device, may allow an accurate measurement of viewer's point of foveation (or points of foveation if two eye-tracking sensors are used). One possible method for eye tracking is disclosed in U.S. Pat. No. 5,638,176 (entitled "Inexpensive Interferometric Eye Tracking System"). Other methods for eye tracking are also possible and contemplated (e.g., the methods for head tracking listed above).

Regardless of which method is used, as the viewer's point of foveation changes position, so does the distribution of samples. For example, if the viewer's gaze is focused on the upper left-hand corner of the screen, the pixels corresponding to the upper left-hand corner of the screen may each be allocated eight or sixteen samples, while the pixels in the opposite corner (i.e., the lower right-hand corner of the screen) may be allocated only one or two samples per pixel. Once the viewer's gaze changes, so does the allotment of samples per pixel. When the viewer's gaze moves to the lower right-hand corner of the screen, the pixels in the upper left-hand corner of the screen may be allocated only one or two samples per pixel. Thus the number of samples per pixel may be actively changed for different regions of the screen in relation the viewer's point of foveation. Note in some embodiments, multiple users may be each have head/eye/hand tracking mechanisms that provide input to graphics system 112. In these embodiments, there may conceivably be two or more points of foveation on the screen, with corresponding areas of high and low sample densities. As previously noted, these sample densities may affect the render process only, the filter process only, or both processes.

Figure 24B:
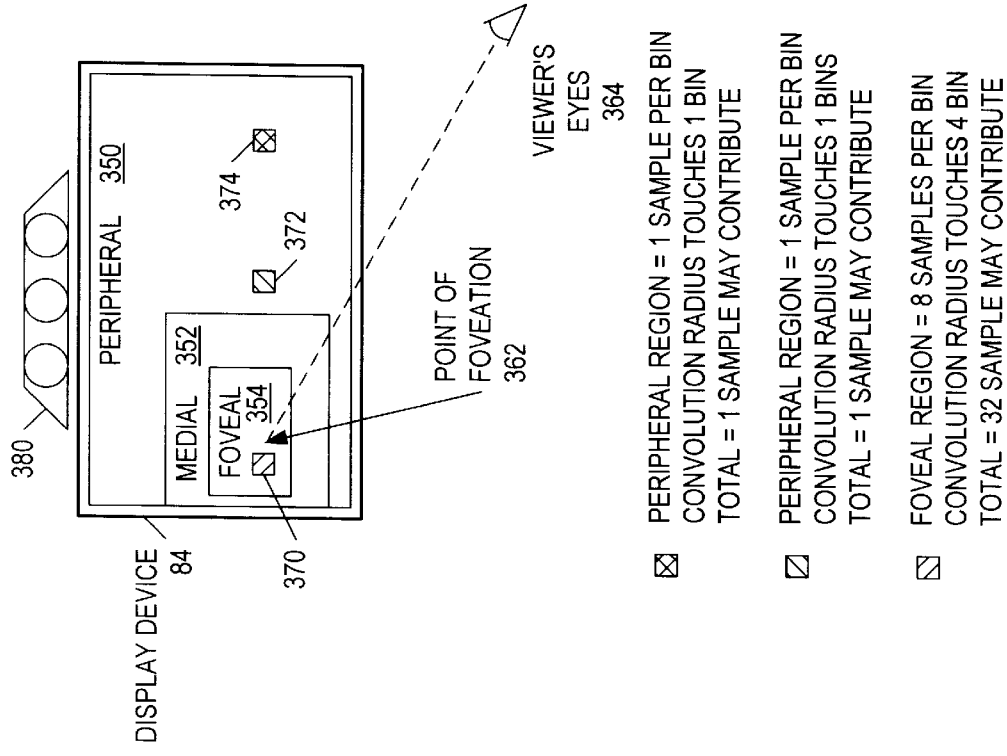
FIGS. 24A–B are diagrams illustrating one embodiment of a graphics system configured to utilize input from an eye tracking or head tracking device.
Figure 24A:
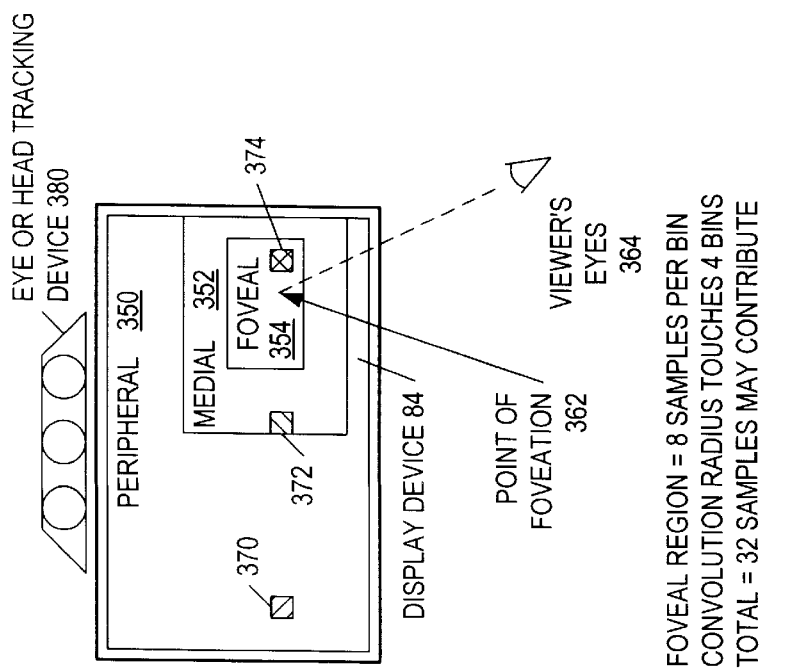

Turning now to FIGS. 24A–B, one embodiment of a method for apportioning the number of samples per pixel is shown. The method apportions the number of samples based on the location of the pixel relative to one or more points of foveation. In FIG. 24A, an eye- or head-tracking device 380 is used to determine the point of foveation 362 (i.e., the focal point of a viewer's gaze). This may be determined by using tracking device 380 to determine the direction that the viewer's eyes (represented as 364 in the figure) are facing. As the figure illustrates, in this embodiment, the pixels are divided into foveal region 354 (which may be centered around the point of foveation 362), medial region 352, and peripheral region 350.

Three sample pixels are indicated in the figure. Sample pixel 374 is located within foveal region 314. Assuming foveal region 314 is configured with bins having eight samples, and assuming the convolution radius for each pixel touches four bins, then a maximum of 32 samples may contribute to each pixel. Sample pixel 372 is located within medial region 352. Assuming medial region 352 is configured with bins having four samples, and assuming the convolution radius for each pixel touches four bins, then a maximum of 16 samples may contribute to each pixel. Sample pixel 370 is located within peripheral region 350. Assuming peripheral region 370 is configured with bins having one sample each, and assuming the convolution radius for each pixel touches one bin, then there is a one sample to pixel correlation for pixels in peripheral region 350. Note these values are merely examples and a different number of regions, samples per bin, and convolution radius may be used.

Turning now to FIG. 24B, the same example is shown, but with a different point of foveation 362. As the figure illustrates, when tracking device 380 detects a change in the position of point of foveation 362, it provides input to the graphics system, which then adjusts the position of foveal region 354 and medial region 352. In some embodiments, parts of some of the regions (e.g., medial region 352) may extend beyond the edge of display device 84. In this example, pixel 370 is now within foveal region 354, while pixels 372 and 374 are now within the peripheral region. Assuming the sample configuration as the example in FIG. 18A, a maximum of 32 samples may contribute to pixel 370, while only one sample will contribute to pixels 372 and 374. Advantageously, this configuration may allocate more samples for regions that are near the point of foveation (i.e., the focal point of the viewer's gaze). This may provide a more realistic image to the viewer without the need to calculate a large number of samples for every pixel on display device 84.

Figure 25A:
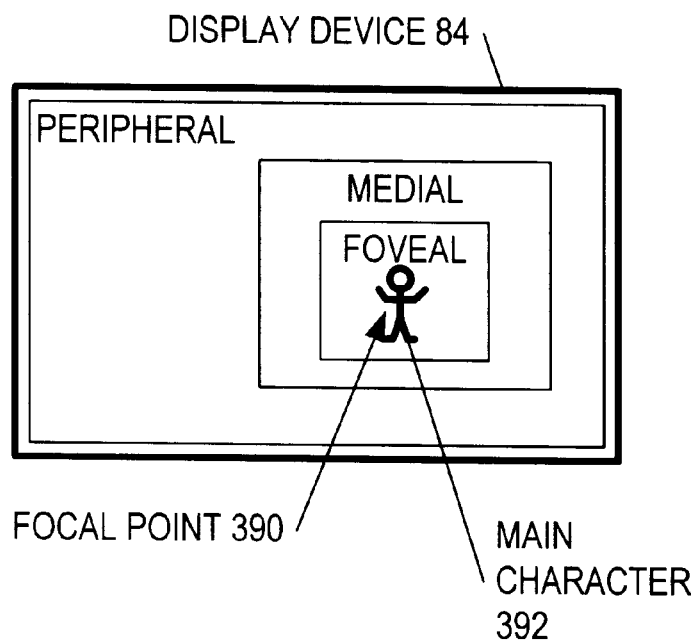
FIGS. 25A–B are diagrams illustrating one embodiment of a graphics system configured to vary region position according to the position of a cursor or visual object.
Figure 25B:
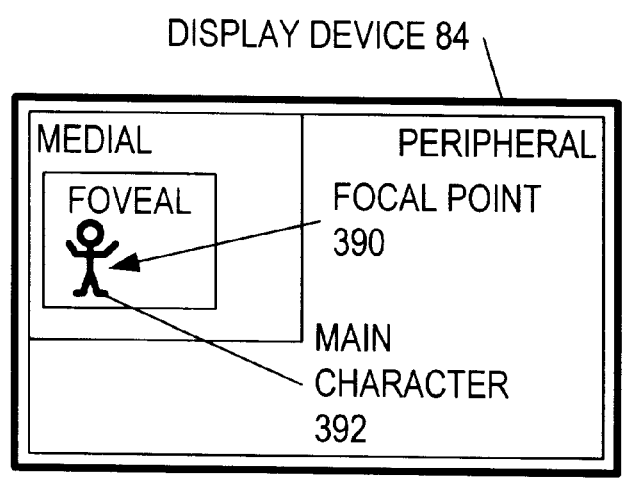

Turning now to FIGS. 25A–B, another embodiment of a computer system configured with a variable resolution super-sampled sample buffer is shown. In this embodiment, the center of the viewer's attention, i.e., the viewer's focal point 390, (and thus very likely the viewer's point of foveation) is determined by position of a main character 392. Medial and foveal regions are centered around main character 392 as it moves around the screen. In some embodiments main character may be a simple cursor (e.g., as moved by keyboard input or by a mouse).

In still another embodiment, regions with higher sample density may be centered around the middle of display device 84's screen. Advantageously, this may require less control software and hardware while still providing a shaper image in the center of the screen (where the viewer's attention may be focused the majority of the time).

Motion Blur Using Sample Masks—FIGS. 26–29

Figure 26:
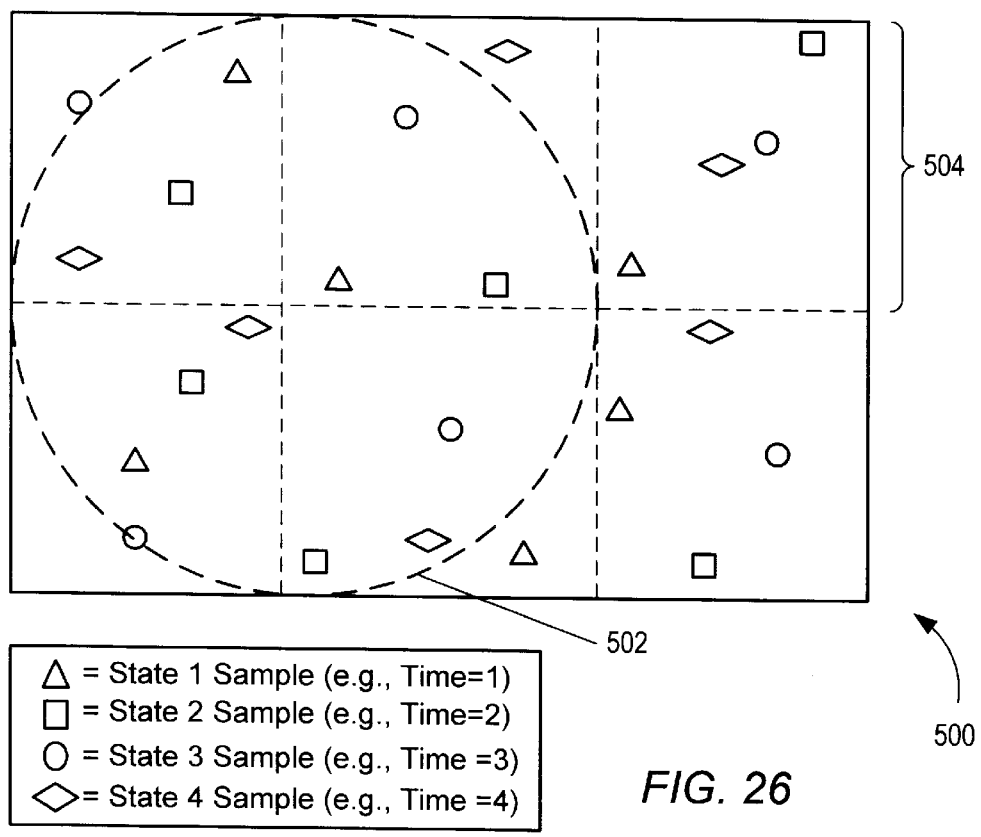
FIG. 26 illustrates details of one embodiment of a sample buffer configured to perform motion blur effects.

As previously noted, computer system 80 may be configured to perform motion blur effects in real-time. Turning now to FIG. 26, one method for performing such motion blur effects is shown. In the figure, large rectangular block 500 represents a portion of sample buffer 162. The smaller box indicated by dashed lines represent the boundaries of bins (e.g., bin 504). In this figure, the samples are distributed according to a stochastic sample positioning scheme. In this embodiment, the particular object to be drawn with a motion blur effect is actually drawn multiple times. For example, an airplane propeller that is to be blurred may be drawn four times while the body of the airplane is drawn once. This is reflected in the figure by showing each set of samples corresponding to a particular propeller position with a different shape. For example, the triangles correspond to the samples drawn at time T=1, while the squares correspond to the samples rendered at time T=2. While new frames may be rendered in a particular time interval (e.g., 12 frames per second), a particular object to be motion blurred may be drawn at a higher rate (e.g., four times per frame, or 48 times per second). The object to be blurred is drawn in a slightly different position for each of the four times it is drawn per frame. Once the object has been drawn the specified number of times, the filtering or convolution function may be performed to generate output pixels. This is indicated in the figure by filter radius 502. As the figure illustrates, the filter selects samples that fall within the filter radius regardless of the samples' rendering time. Thus, samples representing the object in each of its different positions are "blended" to result in a motion blurred output pixel.

In order to render objects multiple times for each frame, a method for allocating samples to each of the render times may be desired. In some embodiments, graphic system 112 may be configured to use sample masks to mask off all but a portion or subset of the samples. The samples making it through the sample mask are then rendered into the sample buffer. The sample mask is then changed, and the object is drawn again with a different set of samples. This process is repeated until a predetermined number of samples have been rendered (e.g., until the sample buffer is full). The sample mask may be implemented in a number of different ways. For example, in some embodiments logic may be used to select a certain number of sample positions from sample position memory 334 for each of the intra-frame rendering times. In another embodiment, graphics processors 90 may be configured to calculate the number of rendering times per frame for a particular object and then mask off the appropriate number of sample positions as they are read from sample position memory 234. It is noted that the sample mask may have different sizes (e.g., the sample mask may be larger than a single pixel).

Motion blur information (for example, the number of rendering times per frame that an object should be drawn) may be encoded in a number of different ways in the three-dimensional graphics data. For example, in one embodiment the motion blur information may be encoded on a per object or per geometric primitive basis. In such an embodiment, each geometric primitive that is subject to motion blurring may include a blur vector comprising a direction of movement and a magnitude or distance of movement. In other embodiments each primitive or object may include just a blur magnitude. The graphics processors may be configured to use this information to redraw the object or primitive at different positions for each of the intra-frame rendering times for a particular frame. Objects or primitives that do not have a motion blur indicator (i.e., objects and primitives that are not motion blurred) are simply rendered as usual at a single position with oversampling as desired.

Figure 27:
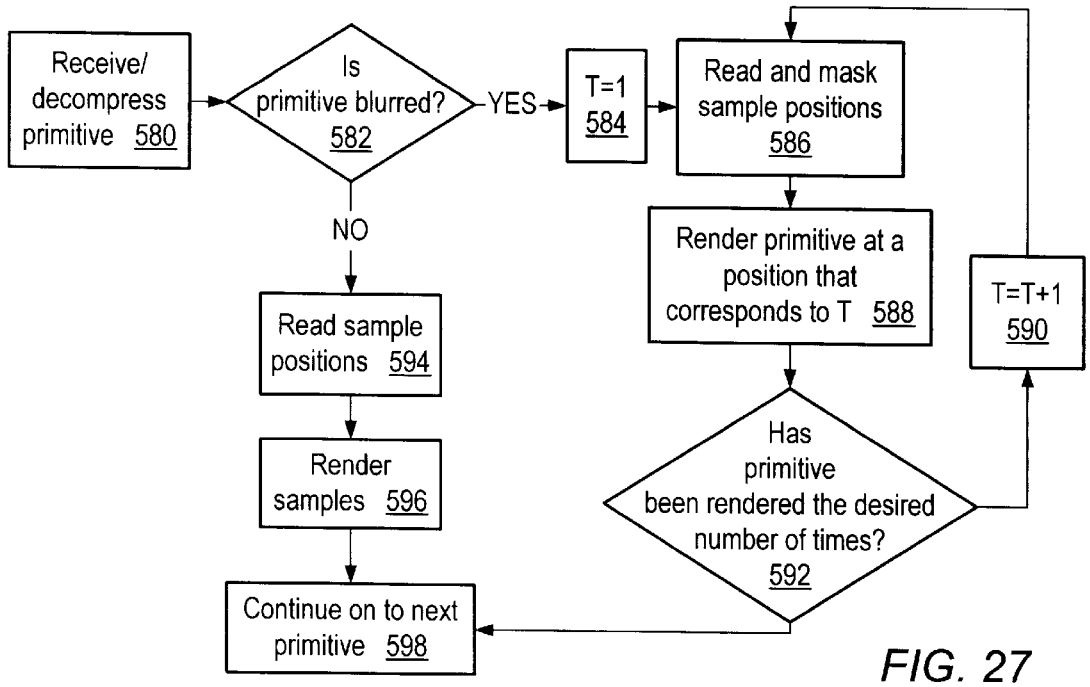
FIG. 27 is a flowchart illustrating one embodiment of a method for performing motion blur.

Turning now to FIG. 27, one embodiment of a method for applying sample masks for motion blur is shown. As previously described, a geometric primitive is received by the graphics processor/rendering unit (step 580). In some embodiments, the primitive may be compressed, and therefore the graphics processor may be configured to decompress the primitive. The graphics processor may then be configured to determine whether or not the primitive is to be blurred (step 582). As previously noted, this may be determined by detecting a particular tag, data field, or blur vector associated with the primitive. If the primitive is not blurred, the sample positions are read from the sample position memory in a traditional manner (step 594). Next, the samples that fall within the primitive are rendered (step 596), and the next primitive is processed (step 598). If, however, the primitive is blurred, then the primitive is rendered multiple times. This may be accomplished through the use of a counter. which is set to an initial value (step 584). Next, the sample positions are read and masked (step 586). For example, assuming there are four samples per bin, and assuming the primitive is rendered at four different times for a particular frame, three of the samples may be masked for each phase of the rendering process to yield one sample rendered at each time for the particular frame (steps 588, 592, and 590). Once the blurred primitive has been rendered the specified number of times, the graphics processor may proceed on to the next primitive (step 598).

Turning now to FIG. 28 another embodiment of a method for performing motion blur on an object or primitive basis is shown. In this embodiment, an indication is received that a particular object or primitive will be blurred (step 510). Next, a counter is initialized to a predetermined starting value (step 512). Next, a particular sample mask is selected using the value of the counter (step 514). The sample mask is then used to read or "pick" samples for rendering from the sample position memory or sample position generator, depending upon the implementation (step 516). The samples are then rendered according to the "state" of the geometric primitives or object that corresponds to the counter (step 518). As used herein, "state" may include object or primitive position, orientation, velocity, acceleration, color, shape, transparency, or other attributes. The samples to be rendered are selected using the sample mask selected by the counter, and stored in a sample buffer (step 520). If this is the final state of the object (step 522), then rendering is complete. At some later time the samples are read from the sample buffer and filtered to form output pixels (step 524). Filtering, as previously described above, may be performed asynchronously relative to the sample rendering process.

If, however, more states of the object or primitive remain to be rendered (step 522), then the counter is incremented (step 524), and the next sample mask is selected (step 514). This process is repeated until all of the object's or primitive's states have been rendered. As noted above, this method may be applied to "states" of an object or primitive, i.e., not just position. In this way effects similar to, yet different from, motion blur may also be performed. For example, smoother real-time morphing may be implemented using this method. In traditional systems, objects morph from a first state to a second state, from the second state to a third state, et seq. Advantageously, by blurring the individual frames of the object, this method may transform the object in a smoother fashion as opposed to a sharp, jerky manner.

Advantageously, the methods depicted in FIGS. 27 and 28 may be performed for a number of different geometric primitives and/or objects on a frame by frame basis. This may allow only blurred objects to be rendered multiple times, thereby saving precious graphics processing resources.

Turning now to FIG. 29, one method for embedding motion blur information into a stream of graphics data is shown. In this embodiment, the vertex data (or geometric primitive data) for a series of objects is interspersed with mask commands. For example, the vertex or primitive data for a first object in a first state (530) is not preceded by a setSampleMask command. Thus, the object is rendered in the default manner (e.g., fully supersampled at a single position or state per frame). However, vertex data for object 2 in state 1 (534) is preceded by a setSampleMask1 of 4 instruction (532). This instruction indicates to the graphics processor that the following set of vertex/primitive data will be blurred and thus a sample mask should be applied. Next, a second setSampleMask instruction (536) is embedded in the data stream preceding a second set of vertex data for object 2 that corresponds to the object in a second state (538). Similarly, a third setSampleMask instruction (540) is embedded before a third set of data for object 2 corresponding to the object in a third state (542). A fourth setSampleMask instruction precedes the fourth set of data for object 2 corresponding to object 2 in a fourth state (546). As this example shows, vertex or primitive data that is not blurred need only be included once in the data stream, while vertex/primitive data that is blurred may be included multiple times, once for each state.

As previously noted, however, other methods are also possible for embedding blur information into a stream of graphics data. For example, in lieu of setSampleMask instructions (532, 536, 540, and 544), it may be possible to simply embed a blur vector indicating the distance and direction the object moves in the time interval allocated to a particular frame. Accompanying this vector may be an indicator of the number of different positions the object should be rendered for each particular frame. Advantageously, this may reduce or eliminate the additional data for each intra-frame state.

In yet another embodiment, the graphics system may be configured to blend the blurred objects with the previous contents of the sample buffer. For example, the objects or primitives to be motion blurred may be preceded by an instruction or tag (similar to he object's transparency value, which could also be used) indicating that the object should be blended with previous contents of the sample buffer (i.e., from the previous frame). In this way the object can be blurred from its previous position to its current position.

Other embodiments and applications for the methods described above are possible and contemplated. For example, in some embodiments eye tracking and/or head tracking may be used to maintain the focus or "sharpness" of objects in motion which the viewer is following, and to blur objects that the viewer is not following. One example of this effect was shown in FIG. 4. To implement this effect, the same method described above may be used, but the blur information may be associated with the non-moving objects or primitives. Alternatively, the entire frame may be blurred while the objects or primitives that viewer is following may be preceded by "unblur" type instructions that instruction the graphics processors to reduce the filter size and/or only render the unblurred objects or primitives once per frame. In some embodiments, the amount of blur may be a function of the movement of an object relative to the viewer's retina, i.e., not necessarily relative to the display device or viewport. In these embodiments eye- and head-tracking devices may be used to determine the movement of an object relative to the viewer's retina.

Figure 30:
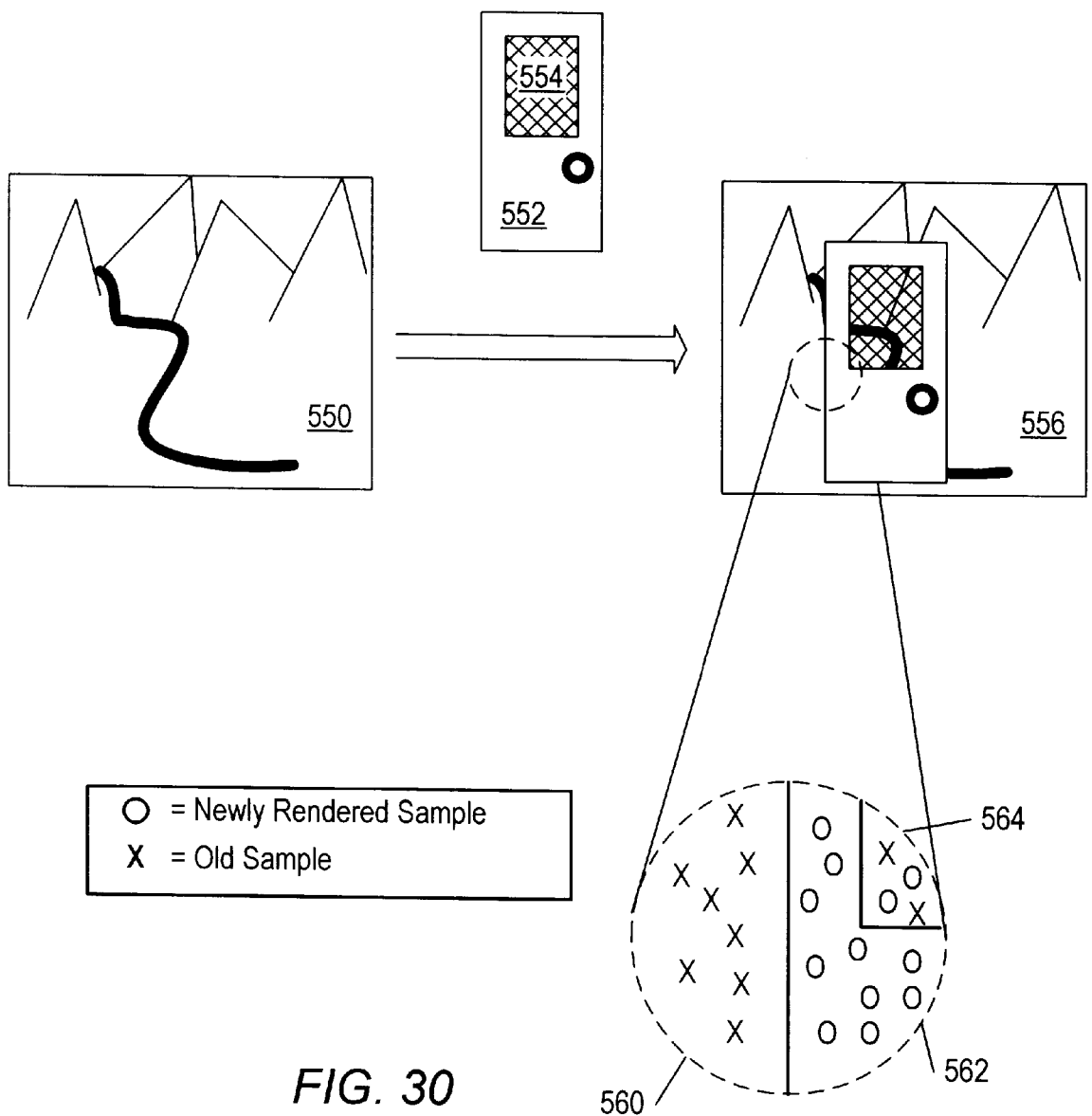
FIG. 30 is a diagram illustrating one method for performing screen door-type transparency.

Transparency Effects Using Sample Masks—FIG. 30

As previously described above, transparency effects, e.g., screen door effects, are another set of effects used to improve the realism of rendered images in computer graphic systems. However, prior art systems have typically been unable to adequately perform such effects in a real-time manner. Advantageously, the graphic system architecture disclosed above may be configured to support real-time transparency effects.

Turning now to FIG. 30, one example of performing transparency effects in a supersampled graphics system is shown. In the figure, block 550 represents the image formed by the contents of the sample buffer after a particular frame has been rendered. Block 552 represents an object that is to be rendered partially transparently on the scene of block 550. Object 552 represents a door with a screened portion 554 that is partially transparent. The desired image once object 552 is rendered into the sample buffer is displayed in block 556. Advantageously, the method of using a sample mask previously described in the context of a motion blur effect (see FIGS. 26-29) may also be used to accomplish transparency effects. This is shown by enlarged sample buffer portions 560, 562, and 564. As the figure illustrates, portions of the final rendered scene 556 comprise exclusively old samples corresponding to scene 550 (see portion 560), portions that comprise exclusively new samples corresponding to object 552 (see portion 556), and portions that comprise both old and new samples (see portion 564). Advantageously, this may be accomplished by using sample masks as described above. For example, portions of object 552 that are nontransparent, i.e., fully opaque, are rendered according to traditional rendering techniques wherein the Z depth of object 552 would indicate that object 552 is "in front of" the objects in scene 550. Thus, object 552 "wins" the Z comparison (or W comparison, in some embodiments) and is rendered completely replacing the samples from object 550 in certain regions (562). However, portions of object 552 that are partially transparent (e.g., portion 554) may be rendered using a sample mask as described above. Thus, a number of the samples falling within portion 554 may be masked from the graphics processor during the rendering process. This advantageously results a mixture of samples corresponding to both the partially transparent region of object 552 (i.e., screen portion 554) and scene 550. This is shown in the corresponding detailed section of portion 564. As previously described above in connection with motion blur, the filtering or convolution process will blend the samples in the mixed portion 564 to result in the desired transparency effect.

Another example of a transparency effect that may be implemented using sample masks is a "rain drop" effect that attempts to mimic the scene perceived by a viewer when looking through a glass window having rain drops on it. In one embodiment, this rain drop effect is implemented by rendering the scene in a normal fashion, and then rendering a plurality of small transparent or semi-transparent spheres or geometric primitives over the scene. This may result in a clear image with blurred spots distributed throughout the image, wherein the blurred spots correspond to the raindrops on the glass window. Additional effects that may be implemented using a sample mask include smoke, particulate, and haze effects.

In some embodiments, the graphics system may be configured to emulate transparency, motion blur, and/or depth of field effects using write masks. For example, a transparent object may have samples selectively masked before they are written into the sample buffer. After filtering, the partially masked object may appear transparent. Advantageously, this embodiment may offer transparency-like effects without the use of a traditional blending operation (e.g., read pixel, perform z-compare, blend, store back to frame buffer). For motion blur-like effects, this configuration may render the blurred object multiple times at different positions. For depth of field effects, the entire scene may be rendered multiple times from perturbed viewpoints.

Depth of Field Effects—FIG. 31

As previously described above, another type of effect that improves realism in rendered images is a depth of field effect. Depth of field effects attempt to mimic the blurring that occurs as an object recedes from a particular focal distance (e.g., corresponding to a point of a lens). For example, this effect can be seen when looking through the viewfinder of a camera that is focused at a particular distance or depth. Objects that are closer than or farther away than the selected focus depths are blurred, while objects at the selected distance are in focus.

Turning now to FIG. 31, one embodiment of a method for performing depth of field effects using samples is shown. In this embodiment, the object or objects that are to be blurred (i.e., those out of focus) are rendered multiple times at slightly different positions. The example in the figure illustrates two objects: (i) a tree in the background that is to be blurred, and (ii) an insect in the foreground that is to be rendered in focus. The tree is rendered multiple times, each time at a slightly different position. This is shown by blocks 570A and 570N. The object to be in focus, however, is rendered only once as shown by block 572. Each cycle of rendering is performed applying a different sample mask. Thus, the resulting mixture of samples corresponds to the tree in a plurality of positions and the insect in a single position. These samples are then filtered or convolved to result in final image 574. Enlarged portions 576 and 578 illustrate the distribution of samples for the example image. Enlarged portion 576 corresponds to a portion of the insect which is only rendered once. Each sample corresponding to the insect is indicated with a "Bo", wherein the subscript represents the time at which the object was rendered. As note above, the state may correspond to a change in position. Enlarged portion 578 comprises samples of the tree rendered at a plurality of different positions (e.g., $T_0, T_1, T_2, \ldots T_n$). Advantageously, the resulting image blurs the desired objects while retaining the sharp or in-focus nature of objects near the focal distance or focal point.

Note, in some embodiments the amount of rendering to generate image 574 may be reduced by drawing the out of focus objects only once, but tagging the corresponding samples with an indicator that a different "blur" filter should be used during the sample-to-pixel conversion process. This method is described in greater detail below in connection with FIGS. 33–34.

In some embodiments, the graphics system may be configured to implement depth of field blurring effects in connection with an eye or head tracking system to reinforce the "virtual reality" experience perceived by the user. For example, the graphics system may be configured to detect which objects corresponds to a viewer's point of foveation or visual focal point. The graphic system may then render those objects sharply (i.e., in focus), and render objects that are at a different depth or that are farther away from the viewers point of foveation in a blurred manner. This may effect may potentially be used in virtual reality implementations to increase realism by mimicking the effects that occur as objects appear further distant from the viewers point of focus or point of foveation.

Figure 32:
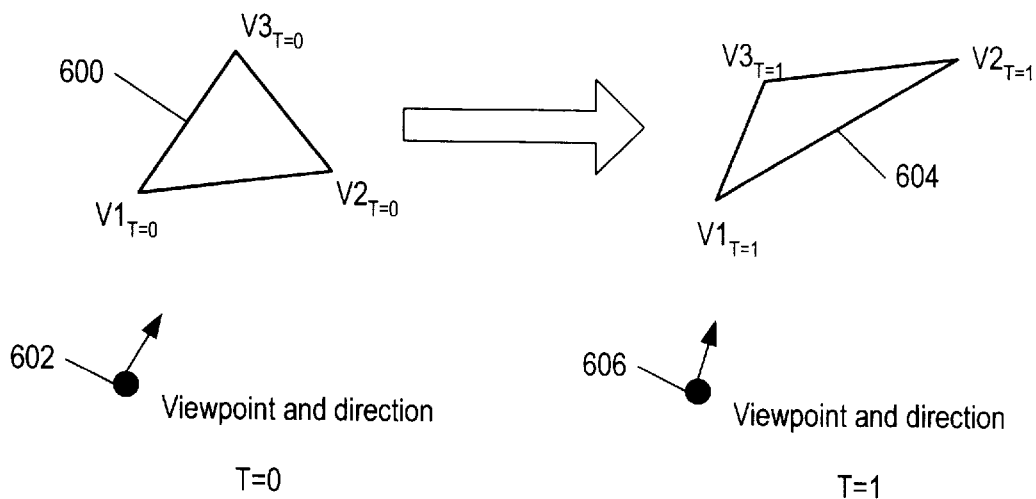
FIG. 32 is a diagram illustrating another method for performing motion blur.

Motion Blur Using Perspective Divide—FIG. 32

In some embodiments, the graphic system may be configured to implement motion blur by using a perspective divide algorithm. Turning now to FIG. 32, one embodiment of a perspective divide algorithm is shown. In the figure, geometric primitive 600 is rendered from two different positions and viewpoint directions. At an initial time T=0, primitive 600 is rendered based on viewpoint and direction 602. At time T=1, primitive 600 is rendered at new position 604 using new viewpoint and direction 606. This process may be repeated a predetermined number of times, and the resulting samples from each of the geometric primitive positions and view point position and directions may be filtered together to generate an accurate motion blurred image. The graphics processors may be configured to perform these calculations for multiple intra-frame times, render a subset of samples for each intra-frame time, and store the samples in the sample buffer. The sample-to-pixel calculation units may then filter the samples to generate a blurred output pixel.

While this method may improve the accuracy of the motion blurred image, it may however dramatically increase the amount of calculations necessary to render each frame. Other possible variations on this method include rendering primitives 600 and 604 from their respective positions, and then interpolating samples for a predetermined number of triangle positions and/or viewpoints and directions. The sample mask method previously described may be used in connection with this perspective divide method to allocation samples among the different rendering positions.

Figure 33:
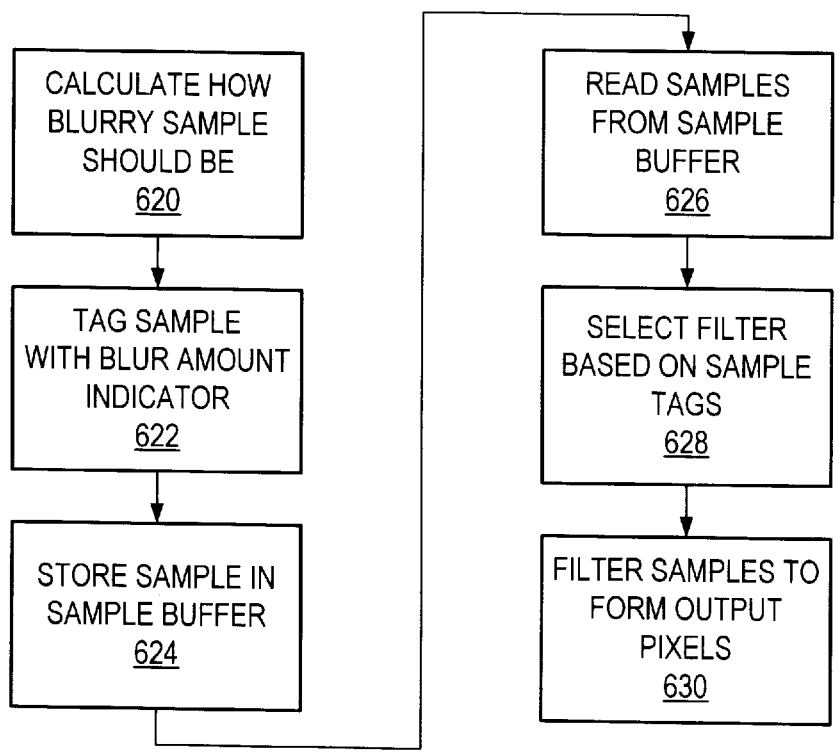
FIG. 33 is a diagram illustrating yet another method for performing motion blur.
Figure 34:
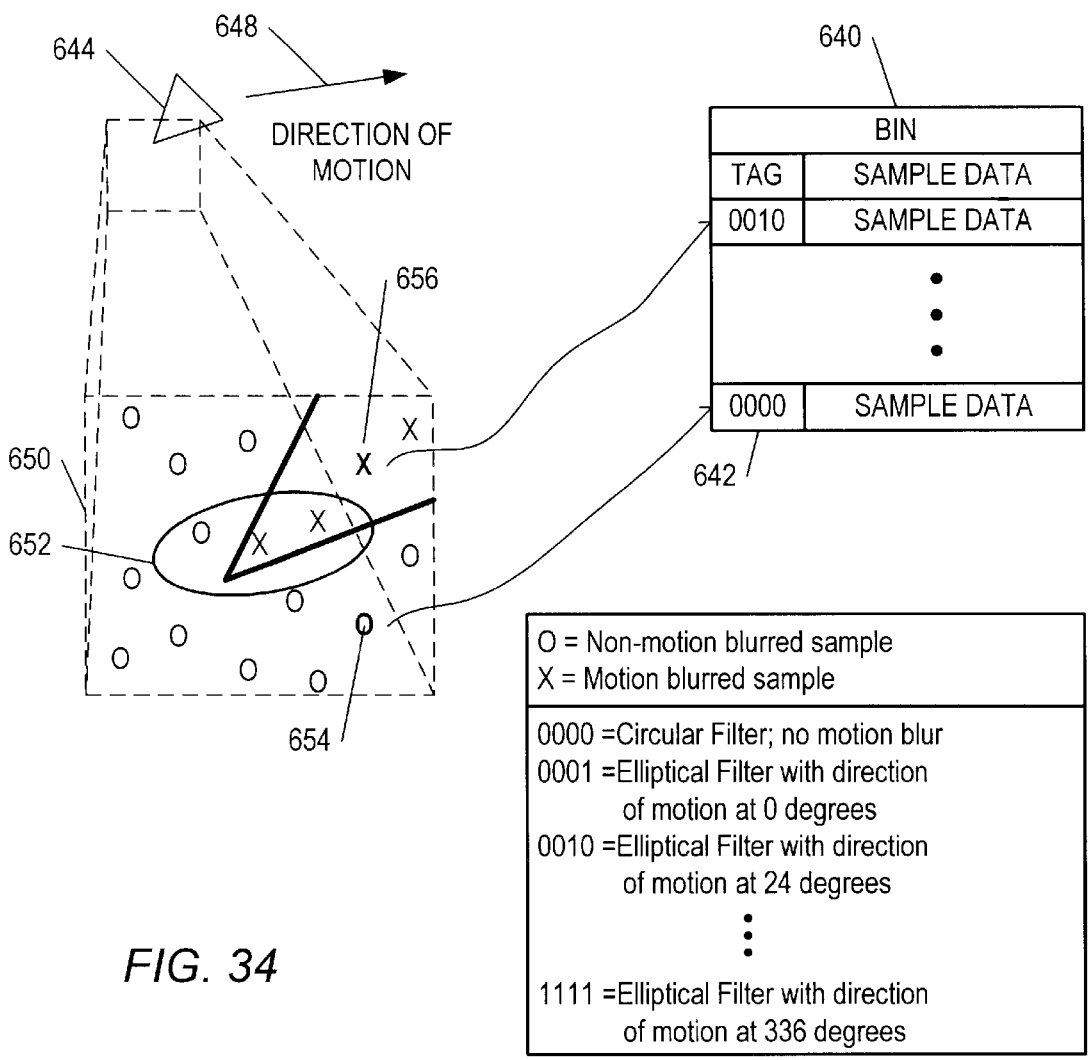
FIG. 34 is diagram illustrating one embodiment of a method for motion blur using varying filter shapes.
Figure 35:
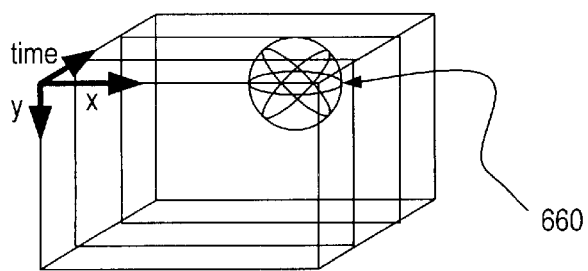
FIG. 35 is a diagram illustrating one embodiment of three-dimensional sample buffer.

Motion Blur Using Sample Tags and Different Filter Extents—FIGS. 33–35

Yet another method for implementing effects such as motion blur (and other blur-type effects) in a graphic system is shown in FIG. 33. This method relies on first calculating how blurry each sample should be (step 620), and then tagging the samples with a blur amount indicator (step 622). The blur amount indicator may provide several different types of information, including for example the size of filter (i.e., the filter extent), the type of filter to be used when filtering the samples, and the orientation of the filer (see discussion below in connection with FIG. 34).

Next, the tagged samples are stored in a sample buffer (step 624). At some later point in time (e.g., asynchronously with sample generation and tagging), samples are read from the sample buffer for filtering (step 626). The sample tags may be read along with the samples, and a filter may be selected based on the sample tags (step 628). Finally, the samples may be filtered using the selected filter to form output pixels (step 630). In some embodiments, the filter is selected to achieve a particular band pass function, with the blur filter having particular characteristics selected so that higher frequencies are attenuated by the filter. In one embodiment, this may be implemented by using a filter with a larger radius (extent). However, in other embodiments in lieu of a larger filter (which may require more processing time than is available in the sample-to-pixel calculation units), the blur filter may be approximated by using a "dumber" filter (e.g., one with less precision than the non-blur filter) of approximately the same radius. Any degradation in the image quality due to the use of the less precise filter is likely to simply add slightly to the level of blur. The exact filter selection may depend upon the quality of the effect desired and the available processing resources in the sample-to-pixel calculation units.

Turning now to FIG. 34, more details of one embodiment of this method for performing motion blur are shown. Generally, FIG. 34 illustrates how filter type and filter orientation may be encoded using sample tags. Geometric primitive 644 is to be motion blurred in the direction of arrow 648. Box 650 represents one bin 640 within a sample buffer. As the figure illustrates, bin 650 is filled a plurality of samples with blur tags (represented with a X) and samples with non-blur tags (represented with a O). Ellipse 652 represents the filter type and orientation used to filter the samples to generate an output pixel with a pixel center corresponding to the center of bin 650. It is noted that this is a simplistic example and that filter extents (i.e., the boundaries of filters) may intersect more than one bin. As the figure illustrates, non-blurry samples 654 may be encoded within bin 640 using a tag 642 that represents a circular filter without motion blur (e.g., "0000"). Similarly, motion blurred samples 656 may be encoded within bin 640 using a tag that represents an elliptical filter with a direction of motion at approximately 24 degrees ("0010"). Since it is likely that in many cases both blurred and non-blurred samples will fall within the bounds of the filter, a number of different methods may be used to determine these "tie breaker" cases. In one embodiment, the filter type having the largest number of sample tags may win. In the example of the figure, the elliptical filter corresponding to a sample tag of "0010" would win (i.e., two "0010" tags to one "0000" tag). In another embodiment, the sample closest to the center of the pixel may be used to select the filter type and/or orientation. Other methods for selecting the filter type are also possible and contemplated. For example, if any samples are present that select a blurry filter, then a blur type filter may be selected. Note, the sample tag encodings in the figure are examples only and are not meant to be limiting. For example, in some cases it may be possible to encode elliptical filter orientations using only 0 through 180 degrees instead of 0 through 360 degrees. In some embodiments it may also be possible to store the blur tag information with sample as part of (or in lieu of) alpha information.

In other embodiments the radius of the filter is then selected on a per-sample basis. For example, when computing a pixel at the edge of a sharp object, any samples from blurred objects that contribute to the pixel will be subject to a lower pass filter. Using tags, each sample's tag may indicate whether the sample's high frequency information will pass through the filter or not. This embodiment, however, may utilize additional processing to perform normalization (i.e., to prevent blurred samples from overwhelming sharp samples).

In another embodiment, this effect may be accomplished by computing the distance from the center of the pixel to the sample, and then using that distance to look up one or more filter parameters (e.g., coefficients) in a pre-computed table. For blurred samples, however, the distance is divided by a certain factor (e.g., two) before being used to perform the table lookup. In some embodiments, the filter parameters stored in the table may be pre-normalized. In other embodiments, a correction table may be used. Alternatively, some of the blurred samples may be discarded.

In some embodiments, a different size filter may be used (e.g., 5×5 for non-blurred, greater than 5×5 for blurred). In still other embodiments, multiple spatial frequency channels may be implemented by recursively applying a series of filters.

Turning now to FIG. 35, another possible implementation for motion blur is shown. In this embodiment, sample buffer 162 comprises a number of layers, wherein each layer corresponds to a particular intra-frame time (some layers may also correspond to different frames, if enough memory space is available). Thus objects to be motion blurred are drawn to multiple time layers at different positions. The filter used to blend these samples may be visualized as a three-dimensional filter 660 (e.g., spherical, ellipsoidal, or cubic). The filter may weight samples that fall within it according to a weighting factor that varies not only according to spatial distance but also to temporal distance (i.e., distance in time from the center of the filter).

In other embodiments, the viewpoint used when rendering the blurred objects is "jiggled" to implement depth of field effects, and the scene (or perhaps just a part of it) is rendered multiple times. The same or a similar effect may be achieved by modifying the transformation matrix that is used during the set up and rendering process for objects or scenes that are to be blurred. In some embodiments, the motion blur effect described above may be implemented by interpolating between an initial model matrix state and a final model matrix state for one or more intermediate states that will be filtered together to form the blurred output pixels.

Normalization

With some of the methods described above, normalization of the blurred output pixel values may be necessary to prevent the blurred pixels from "overwhelming" the non-blurred output pixels. This may occur because the number of samples considered for blurred pixels may be larger than the number of samples considered for non-blurred pixels (e.g., as the result of having a larger filter size). Normalization may be accomplished in a number of ways (e.g., by dividing by the total number of samples that contributed to the output pixel value. One type of normalization is described in connection with FIG. 22 (see e.g., block 312) above.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A graphics system comprising:
   one or more graphics processors configured to receive a set of three-dimensional (3D) graphics data and render a plurality of samples based on the set of 3D graphics data, wherein the graphics processors are configured to generate sample tags for the samples, wherein the sample tags are indicative of whether or not the samples are to be blurred;
   a super-sampled sample buffer coupled to receive and store the plurality of samples from the graphics processor; and
   one or more sample-to-pixel calculation units coupled to receive and filter the samples from the super-sampled sample buffer to generate output pixels, wherein the output pixels are displayable to form an image on a display device, and wherein the sample-to-pixel calculation units are configured to select the filter attributes used to filter the samples into output pixels based on the sample tags.

2. The graphics system as recited in claim 1, wherein the sample-to-pixel calculation units filter the samples in real-time and convey the output pixels to a display device without storing the output pixels in an intervening frame buffer.

3. The graphics system as recited in claim 1, wherein the filter attributes include the filter's extent.

4. The graphics system as recited in claim 1, wherein the filter attributes include the filter's radius.

5. The graphics system as recited in claim 1, wherein the filter attributes include the filter's shape.

6. The graphics system as recited in claim 1, wherein the filter attributes include directional orientation of the filter.

7. The graphics system as recited in claim 1, wherein the filter attributes include the filter type.

8. The graphics system as recited in claim 1, wherein the sample-to-pixel calculation units are configured to select either a circular filter or an elliptical filter based on the sample tags.

9. The graphics system as recited in claim 8, wherein the sample-to-pixel calculation units are configured to select the orientation of the elliptical filter based on the sample tags.

10. The graphics system as recited in claim 1, wherein the filter attributes include the distance from the center of the filter beyond which samples no longer contribute.

11. The graphics system as recited in claim 1, wherein the filter attributes include the number of samples to be filtered per pixel.

12. The graphics system as recited in claim 1, wherein the filter attributes include the maximum number of samples to be filtered per pixel.

13. The graphics system as recited in claim 1, wherein the filter attributes include the minimum number of samples to be filtered per pixel.

14. The graphics system as recited in claim 1, wherein the sample-to-pixel calculation units are configured to select the filter attributes used to filter the samples on a pixel-by-pixel basis based on the sample tags that correspond to the samples being filtered for each particular output pixel.

15. The graphics system as recited in claim 1, wherein the sample-to-pixel calculation units are configured to select the filter attributes used to filter the samples into output pixels based on the sample tags that correspond to the samples that are closest to the center of the filter.

16. The graphics system as recited in claim 1, wherein the sample-to-pixel calculation units are configured to select the filter attributes used to filter the samples into output pixels based on the most prevalent sample tag for each set of samples being filtered to form each particular output pixel.

17. The graphics system as recited in claim 1, wherein the samples are stored in the sample buffer according to bins, wherein the sample-to-pixel calculation units are configured to select a first filter radius when no samples with tags that indicate high levels of blur within any of the bins that contain potential samples for a particular output pixel, wherein the sample-to-pixel calculation units are configured to select a second filter radius when there are samples with tags that indicate high levels of blur within one or more of the bins that contain potential samples for a particular output pixel, wherein the second filter radius is greater than the first filter radius.

18. The graphics system as recited in claim 1, wherein the tags are stored in the sample buffer in lieu of alpha information.

19. The graphics system as recited in claim 1, wherein the graphics processor is configured to calculate which filter attributes will result in a desired final image based on the 3D graphics data.

20. A graphics system comprising:
a means for receiving a set of three-dimensional (3D) graphics data and rendering a plurality of samples based on the set of 3D graphics data, wherein the means for receiving and rendering is configured to generate sample tags for the samples, wherein the sample tags are indicative of whether or not the samples are to be blurred;
a sample buffer coupled to receive and store the plurality of rendered samples; and
a means for calculating pixels from samples, wherein the means for calculating is coupled to receive and filter samples from the sample buffer to generate output pixels, wherein the output pixels are displayable to form an image on a display device, and wherein the means for calculating is configured to select the filter attributes used to filter the samples into output pixels based on the sample tags.

21. A method for rendering a set of 3D graphics data, the method comprising:
rendering a plurality of samples based on the 3D graphics data;
generating tags for the samples, wherein the tags are indicative of the samples' blurriness;
storing the rendered samples and tags into a sample buffer;
selecting a set of stored samples to be filtered;
selecting filter attributes based on the selected samples' tags; and
filtering the selected samples to form output pixels using the selected filter attributes, wherein the output pixels are displayable to form an image based on the 3D graphics data.

22. The method as recited in claim 21, wherein the output pixels are output without being stored into a frame buffer.

23. The method as recited in claim 21, wherein the filtering is performed in real-time.

24. The method as recited in claim 21, wherein the filter attributes include the filter's extent.

25. The method as recited in claim 21, wherein the filter attributes include the filter's radius.

26. The method as recited in claim 21, wherein the filter attributes include the filter's shape.

27. The method as recited in claim 21, wherein the filter attributes include directional orientation of the filter.

28. The method as recited in claim 21, wherein the filter attributes include the filter type.

29. The method as recited in claim 21, wherein the filter attributes include the distance from the center of the filter beyond which samples no longer contribute.

30. The method as recited in claim 21, wherein the filter attributes include the number of samples to be filtered per pixel.

31. The method as recited in claim 21, wherein the filter attributes include the maximum number of samples to be filtered per pixel.

32. The method as recited in claim 21, wherein the filter attributes include the minimum number of samples to be filtered per pixel.

33. The method as recited in claim 21, wherein said selecting filter attributes is performed on a pixel-by-pixel basis based on the sample tags that correspond to the set of samples being filtered for each particular output pixel.

34. The method as recited in claim 21, wherein said selecting filter attributes is performed based on the sample tags that correspond to the samples that are closest to the center of the filter.

35. The method as recited in claim 21, wherein said selecting filter attributes is performed based on the most prevalent sample tag for the set of samples selected for each particular output pixel.

36. The method as recited in claim 21, wherein the tags are stored in the sample buffer in an area of the sample buffer that is reserved for alpha information.

37. The method as recited in claim 21, wherein the tags encode filter attribute information to implement one or more of the following effects: motion blur, depth of field effects, and ripple effects.

38. The graphics system as recited in claim 21, wherein the tags encode filter attribute information to implement one or more of the following effects: motion blur, depth of field effects, and ripple effects.

39. The method as recited in claim 21, wherein the samples are stored in the sample buffer according to bins, wherein said selecting filter attributes comprises selecting a first filter radius when there are no samples that have tags that indicate high levels of blur within any of the bins that contain the set of selected samples for a particular output pixel, and wherein said selecting filter attributes comprises selecting a second filter radius when there are samples that have tags that indicate high levels of blur within one or more of the bins that contain the set of selected samples for a particular output pixel, wherein the second filter radius is greater than the first filter radius.

40. A method for rendering 3D graphics data, the method comprising:
   detecting which objects in the 3D graphics data are moving more than a predetermined threshold amount relative to a viewer's retina;
   rendering samples corresponding to the detected moving objects and non-moving objects into a sample buffer, wherein the samples corresponding to the moving objects are tagged to indicate that motion blurring is to be performed; and
   filtering the samples to form output pixels, wherein the output pixels are usable to form an image on a display device, wherein said filtering comprises using a first filter for samples without tags and a second filter for samples with tags.

41. The method as recited in claim 40, wherein said rendering comprises tagging the samples corresponding to the moving objects with a multiple-bit tag, wherein the multiple-bit tag is indicative of the amount of blur that is to be applied to the sample.

42. The method as recited in claim 40, wherein said rendering comprises tagging the samples corresponding to the moving objects with a multiple-bit tag, wherein the multiple-bit tag is indicative of one of a plurality of different filters to be applied to the sample.

43. The method as recited in claim 40, wherein the first filter has a larger radius than the second filter.

44. The method as recited in claim 40, wherein the first filter has a larger extent than the second filter.

45. The method as recited in claim 40, wherein the first filter is a lower band pass filter than the second filter.

46. The method as recited in claim 40, wherein the first filter is selected to the moving objects to appear more perceptually blurred than non-moving objects filtered using the second filter.

47. The method as recited in claim 40, further comprising:
   normalizing the samples corresponding moving objects; and
   normalizing the output pixels.

48. A method for rendering 3D graphics data, the method comprising:
   receiving a set of compressed graphics data;
   decompressing the graphics data;
   detecting which objects are to be blurred;
   rendering samples corresponding to blurred and non-blurred objects into a sample buffer, wherein the samples corresponding to moving objects are tagged to indicate that are to be blurred; and
   filtering the samples to form an output pixel by:
      calculating the distance from the center of output pixel to each sample;
      using the calculated distance to index into a table of pre-computed contribution factors for samples corresponding to non-blurred objects; and
      using a fraction of the calculated distance to index into a table of pre-computed contribution factors for samples corresponding to blurred objects.

49. The method as recited in claim 48, further comprising:
   normalizing the samples corresponding moving objects; and
   normalizing the output pixels.

* * * * *